(12) United States Patent
Rodriguez Erdmenger et al.

(10) Patent No.: US 12,209,533 B2
(45) Date of Patent: Jan. 28, 2025

(54) HEAT DRIVEN THERMAL MANAGEMENT SYSTEMS AND METHODS FOR OPERATING THE SAME

(71) Applicant: General Electric Company, Schenectady, NY (US)

(72) Inventors: Rodrigo Rodriguez Erdmenger, Garching (DE); David Raju Yamarthi, Bengaluru (IN); Maysaa Rizk, Garching (DE); David Justin Brady, Lynn, MA (US); Adam Joseph Wangler, Evendale, OH (US); Ismail Hakki Sezal, Garching (DE); Michael Joseph Murray, West Chester, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/176,246

(22) Filed: Feb. 28, 2023

(65) Prior Publication Data

US 2024/0175390 A1    May 30, 2024

(30) Foreign Application Priority Data

Nov. 29, 2022  (IN) .............................. 202211068692

(51) Int. Cl.
| | |
|---|---|
| *F02C 1/10* | (2006.01) |
| *F02C 7/14* | (2006.01) |
| *F02C 9/26* | (2006.01) |

(52) U.S. Cl.
CPC .................. *F02C 1/10* (2013.01); *F02C 7/14* (2013.01); *F02C 9/263* (2013.01); *F05D 2260/213* (2013.01); *F05D 2270/304* (2013.01)

(58) Field of Classification Search
CPC ...... F02C 1/04; F02C 1/08; F02C 1/10; F02C 7/14; F02C 7/18; F02C 7/185; F02C 7/16
See application file for complete search history.

(56) References Cited

U.S. PATENT DOCUMENTS

| | | | | |
|---|---|---|---|---|
| 3,503,205 A | * | 3/1970 | Peter ........................ | G21D 5/06 60/39.181 |
| 3,583,156 A | | 6/1971 | Schabert | |
| | | (Continued) | | |

FOREIGN PATENT DOCUMENTS

| | | |
|---|---|---|
| CN | 113266441 | 8/2021 |
| EP | 2807348 | 12/2014 |

(Continued)

OTHER PUBLICATIONS

European Patent Office, "Extended European Search Report," issued Apr. 2, 2024 in connection with European Patent Application No. 23212438.8, 7 pages.

*Primary Examiner* — Alain Chau
(74) *Attorney, Agent, or Firm* — Hanley, Flight & Zimmerman, LLC

(57) ABSTRACT

Apparatus, systems, and articles of manufacture are disclosed to power thermal management systems with heat of a working fluid therein. Example thermal management system include: a thermal transport bus loop fluidly coupled to at least one heat source exchanger and at least one heat sink exchanger; a turbomachine including a turbine and a compressor, the turbine and compressor rotatably interlocked via a shaft, the compressor coupled to the thermal transport bus loop, the turbine including an inlet and an outlet, the inlet connected to a first point of the thermal transport bus loop via a first flowline, the outlet connected to a second point of the thermal transport bus loop via a second flowline; and a control valve coupled to the first flowline, the control valve (Continued)

to adjust a mass flowrate of the heat exchange fluid in the first flowline based on a speed of the shaft.

18 Claims, 11 Drawing Sheets

(56) References Cited

U.S. PATENT DOCUMENTS

| | | | | |
|---|---|---|---|---|
| 3,630,022 | A * | 12/1971 | Jubb | F02C 9/24 60/650 |
| 7,726,114 | B2 | 6/2010 | Evulet | |
| 9,014,791 | B2 * | 4/2015 | Held | F02C 3/34 600/476 |
| 9,118,226 | B2 * | 8/2015 | Kacludis | F01K 11/00 |
| 9,644,502 | B2 * | 5/2017 | Peter | F02C 1/10 |
| 9,657,599 | B2 | 5/2017 | Stapp | |
| 9,863,287 | B2 * | 1/2018 | Kacludis | H02K 7/1823 |
| 10,060,300 | B2 | 8/2018 | Bastnagel et al. | |
| 10,941,706 | B2 * | 3/2021 | Sen | F02C 3/04 |
| 10,954,824 | B2 | 3/2021 | Laskowski et al. | |
| 11,015,534 | B2 * | 5/2021 | Smith | F02C 7/185 |
| 11,098,615 | B2 | 8/2021 | Huang et al. | |
| 11,149,592 | B2 * | 10/2021 | Ryu | F02C 1/10 |
| 11,261,792 | B2 * | 3/2022 | Niergarth | F02C 7/16 |
| 11,506,131 | B2 * | 11/2022 | Smith | F02C 7/16 |
| 11,629,647 | B2 * | 4/2023 | Staubach | F02C 7/32 60/39.511 |
| 2011/0000182 | A1 * | 1/2011 | Lasker | F03G 6/068 60/39.24 |
| 2012/0067055 | A1 * | 3/2012 | Held | F02C 1/06 60/772 |
| 2014/0103661 | A1 * | 4/2014 | Kacludis | F02C 1/04 290/54 |
| 2015/0345341 | A1 * | 12/2015 | Kacludis | F01K 25/103 60/671 |
| 2016/0017759 | A1 | 1/2016 | Gayawal et al. | |
| 2016/0298500 | A1 * | 10/2016 | Peter | F01K 25/103 |
| 2017/0030266 | A1 * | 2/2017 | Cerny | F02C 7/224 |
| 2017/0167382 | A1 * | 6/2017 | Miller | B64D 15/06 |
| 2018/0187627 | A1 * | 7/2018 | Apte | F02C 1/105 |
| 2019/0249599 | A1 * | 8/2019 | Sen | F02C 3/04 |
| 2020/0165982 | A1 * | 5/2020 | Smith | F02K 3/115 |
| 2020/0200049 | A1 * | 6/2020 | Ryu | F02B 37/12 |
| 2021/0148283 | A1 * | 5/2021 | Niergarth | F01D 25/12 |
| 2021/0301729 | A1 * | 9/2021 | Staubach | F02C 6/18 |
| 2022/0127009 | A1 | 4/2022 | Thomassin et al. | |
| 2022/0260037 | A1 * | 8/2022 | Stoia | F01K 7/32 |

FOREIGN PATENT DOCUMENTS

| | | | |
|---|---|---|---|
| EP | 3907799 | 11/2021 | |
| WO | WO-9745631 A1 * | 12/1997 | F02C 1/00 |

* cited by examiner

HEAT DRIVEN THERMAL MANAGEMENT SYSTEMS AND METHODS FOR OPERATING THE SAME

RELATED APPLICATION

This patent claims the benefit of Indian Provisional Patent Application No. 202211068692, which was filed on Nov. 29, 2022. Indian Provisional Patent Application No. 202211068692 is hereby incorporated herein by reference in its entirety. Priority to Indian Provisional Patent Application No. 202211068692 is hereby claimed.

FIELD OF THE DISCLOSURE

This disclosure relates generally to thermal management systems, and, more particularly, to heat driven thermal management systems and methods for operating the same.

BACKGROUND

Aircraft typically include various accessory systems to support the operation of the aircraft and/or its gas turbine engine(s). For example, such accessory systems may include a lubrication system to lubricate components of the engine (s), an engine cooling system to provide cooling air to engine components, a fuel heating system to increase a temperature of fuel prior to injection into a combustion section, an environmental control system to provide cooled air to the cabin of the aircraft, a deicing system to melt ice formations on portions of a nacelle or other engine components, and/or the like. As such, during operation of the aircraft, heat is added to or removed from fluid(s) (e.g., oil, air, etc.) used in these accessory systems.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
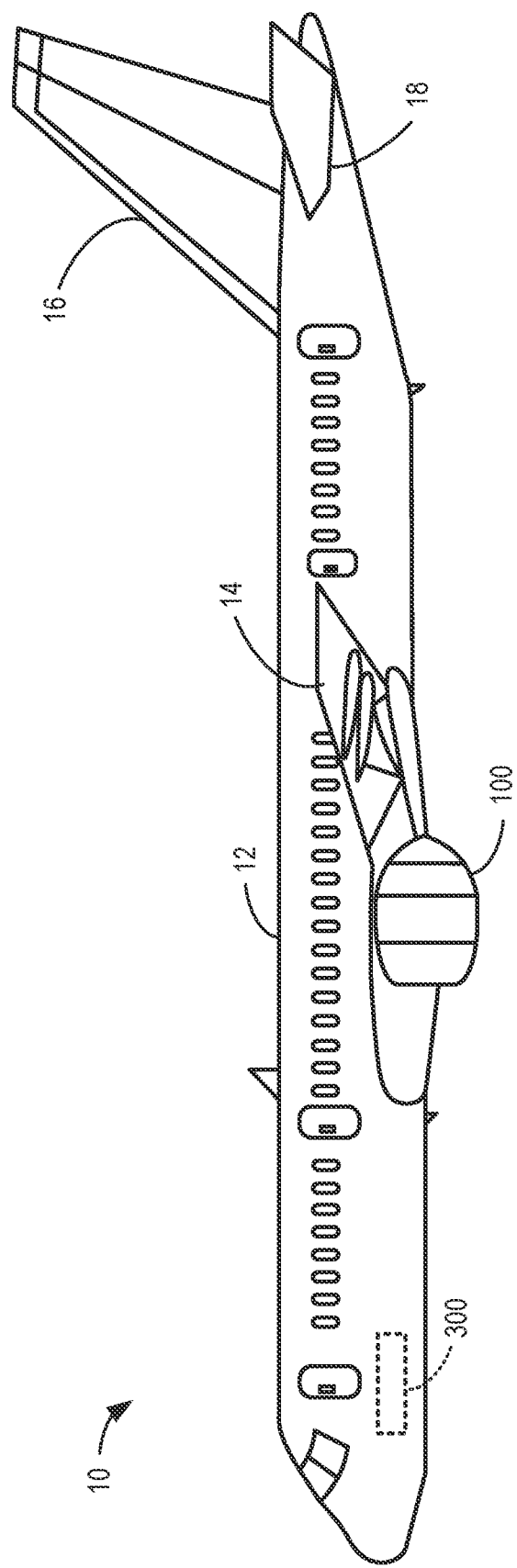
FIG. 1 is a side view of an example aircraft.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

Approximating language, as used herein throughout the specification and claims, is applied to modify any quantitative representation that could permissibly vary without resulting in a change in the basic function to which it is related. Accordingly, a value modified by a term or terms, such as "about", "approximately", "substantially", and "just" are not to be limited to the precise value specified. In at least some instances, the approximating language may correspond to the precision of an instrument for measuring the value, the precision of a first position relative to a second position, or the precision of the methods or machines for constructing or manufacturing the components and/or systems. For example, the approximating language may refer to being within a ten percent margin.

The terms "upstream" and "downstream" refer to the relative direction with respect to a flow in a pathway. For example, with respect to a fluid flow, "upstream" refers to the direction from which the fluid flows, and "downstream" refers to the direction to which the fluid flows.

As used herein, in the context of describing the position and/or orientation of a first object relative to a second object, the term "substantially orthogonal" encompasses the term orthogonal and more broadly encompasses a meaning whereby the first object is positioned and/or oriented relative to the second object at an absolute angle of no more than five degrees (5°) from orthogonal. For example, a first axis that is substantially orthogonal to a second axis is positioned and/or oriented relative to the second axis at an absolute angle of no more than five degrees (5°) from orthogonal.

As used herein, "radially" is used to express a point or points along a radial vector originating at a central axis of a rotating body and pointing perpendicularly outward from the central axis. For example, fluid is said to accelerate radially outward from an impeller, meaning that the fluid flows outward from a central axis (axis of rotation) of the impeller at a direction that is substantially orthogonal to the central axis.

Some aircraft generate thrust using gas turbine engines and include thermal management system(s) (TMS(s)) to transfer heat to/from accessory systems in the engine(s). Such a TMS includes a thermal transport bus (TTB) to transmit a heat exchange fluid and/or a working fluid (e.g., fuel, oil, air, supercritical carbon dioxide (sCO2), etc.) between the accessory systems and/or engine components. The working fluid absorbs heat from and/or transfers heat to the systems and/or components. Such gas turbine engines can be described as operating according to a Brayton cycle, which consists of adiabatic compression (in a compression stage), isobaric heat addition (in a combustion stage), adiabatic expansion (in a turbine stage), and isobaric heat rejection (in an exhaust stage). As such, thermal management systems described herein and included in aircraft with gas turbine engines can be referred to as advanced Brayton cycle loops, apparatus, or systems.

In some examples, a TMS uses sCO2 as the working fluid due to its low viscosity and high specific heat, which makes sCO2 more thermally conductive than other heat exchange fluids (e.g., water, air, etc.), and enables heat exchangers to efficiently transfer heat to and/or from the sCO2. In such examples, the TMS includes an sCO2 pump to pressurize the working fluid within the TTB. The pump can be centrifugal pump that uses an electric motor to rotate a shaft coupled to an impeller, which draws the working fluid into an inlet and accelerates the working fluid radially outward into an outlet. In some examples, the turbine stages of the gas turbine engine generate electricity and provide electrical power to the motor. The motor transfers the electrical energy into mechanical work to rotate the shaft and pump the working fluid. However, there can be electrical losses associated with such a configuration. For example, electrical connections within a generator unit of the turbine engines, electrical connections between the generator unit and the pump motor, and electrical connections within the motor can lose electrical energy in the form of waste heat generation due to electrical resistances therein. Therefore, the electrical power of the motor can experience substantial losses before being converted into mechanical work at the pump shaft. Furthermore, since the motor uses a portion of the electrical energy that the engines generate, that portion of energy is unable to be supplied to other systems within the aircraft. For example, other auxiliary power systems, such as, cabin lighting, air conditioning, ventilation, etc., could use electrical power that the pump motor otherwise consumes.

Furthermore, the pump and the motor can be a significant contributor to weight and space consumption within the engines and/or onboard the aircraft. In some examples, the size and weight of the pump can be increase proportionally with a size (e.g., thrust class) of the engine. For example, the TMS can be used to add heat to fuel upstream of a fuel injector of the gas turbine engine to improve the efficiency of combustion. Thus, when the engine is of a relatively large size, the motorized pump of the TMS can also be of a relatively large size (e.g., 40 pounds (lbs.), 50 lbs., 60 lbs., etc.) to provide the working fluid at a flowrate corresponding to a flowrate of the fuel flowing into the injector. As the pump and motor sizes increase, so does the amount of waste heat generation. Since the pump motor generates waste heat, cooling systems are included in and/or around the pump to absorb the heat, increase the efficiency of the motor, and inhibit thermal damage from occurring. Such cooling systems can further increase the real estate consumption of the pump. In some examples, the working fluid itself is used as the coolant to absorb heat from the motor. In such examples, less working fluid is utilized in the TMS since a portion of the working fluid is diverted to the motor.

Example heat driven thermal management systems (e.g., heat driven advanced Brayton cycle loops, heat driven advanced Brayton cycle apparatus, heat driven advanced Brayton cycle systems, etc.) disclosed herein include a turbomachine rather than an electrically powered pump to pressurize and accelerate the working fluid in the TTB. The turbomachine of example systems disclosed herein includes a turbine rotatably interlocked with a compressor via a shaft. Example systems disclosed herein include a first flowline that branches from the TTB at a point where temperature and thermal energy values of the working fluid are substantially high and leads to an inlet of the turbine. In some examples, the point where the flowline diverts from the TTB is just downstream (e.g., within one meter) of a heat source exchanger. In some other examples, a plurality of (e.g., two, three, etc.) heat source exchangers are included in the TMS in serial order, and the point where the flowline diverges from the TTB is just downstream of a last (e.g., furthest downstream) heat source exchanger in the TTB. Examples systems disclosed herein includes the turbine to expand the working fluid, extract thermal energy, and convert the thermal energy into mechanical work. The mechanical work causes the shaft to rotate, which causes the compressor of example systems disclosed herein to rotate, which compresses, pressurizes, and/or accelerates the working fluid in the TTB.

Example heat driven TMSs disclosed herein eliminate the need for a motor driven pump to drive the flow of the working fluid in the TTB. As such, electrical energy that the gas turbine engines generate can be conserved and allocated to other onboard systems. Furthermore, example systems disclosed herein can have substantial weight reductions (e.g., 40 lbs., 50 lbs., 60 lbs., etc.) and space reductions (e.g., 30 cubic inches ($in^3$), 40 $in^3$, 50 $in^3$, etc.) due to the replacement of the pump with the turbomachine. For example, overall system volume (or space) is conserved when the turbomachine replaces the housing that structures the pump and motor, the cooling system that cools the motor, the control system of the motor, etc. Example systems disclosed herein can be assembled and/or packaged into smaller spaces due to the fewer components and/or systems associated with electric sCO2 pumps. Example heat driven TMSs disclosed herein can also operate more efficiently by eliminating electrical losses associated with motor driven pumps. In other words, example systems disclosed herein operate are more efficiently because the mechanical energy losses (e.g., vibrations, friction, etc.) of the turbomachine are substantially less than the electrical energy losses described above. Furthermore, example heat driven TMSs disclosed herein reduce the complexity of the TMS since the pump is not utilized. For example, pumps designed to pressurize sCO2 in the TTB can be costly to design, manufacture, and maintain, especially when the pumps include supplementary systems (e.g., self-lubricating systems, dynamic axial loading systems, dynamic radial bearing systems, etc.) to optimize pump performance. Example heat drive TMSs disclosed herein can include a turbomachine with a motor-generator unit (M-G unit) connected to the shaft. In some examples, the motor of the M-G unit can supplement the power transferred to the compressor from the turbine when needed, or the generator of the M-G unit can produce electrical energy based on the rotation of the shaft. The electricity that example systems disclosed herein generate can be stored in batteries already onboard the aircraft. Therefore, not only can example heat driven TMSs disclosed herein operate as a self-powered systems that do not consume aircraft power, but such example systems can also operate as power plants that supply energy to various onboard systems.

It should be appreciated that, although examples disclosed herein refer primarily to sCO2 as the working fluid, other types of working fluids are also applicable, such as liquid helium, helium-xenon mixtures, etc.

For the figures disclosed herein, identical numerals indicate the same elements throughout the figures. Referring now to the drawings, FIG. 1 is a side view of an example aircraft 10. As shown in FIG. 1, the aircraft 10 includes a fuselage 12 and a pair of wings 14 (one is shown) extending outward from the fuselage 12. In the illustrated example, a gas turbine engine 100 is supported on each wing 14 to propel the aircraft through the air during flight. Additionally, the aircraft 10 includes a vertical stabilizer 16 and a pair of horizontal stabilizers 18 (one is shown). However, in some examples, the aircraft 10 includes engines of different types and/or in different positions than the illustrative example of FIG. 1.

Furthermore, the aircraft 10 can include an example first thermal management system 300 (TMS 300) for transferring heat between fluids supporting the operation of the aircraft 10. More specifically, the aircraft 10 can include one or more accessory systems configured to support the operation of the aircraft 10. For example, such accessory systems include a lubrication system that lubricates components of the engines 100, a cooling system that provides cooling air to components of the engines 100, an environmental control system that provides cooled air to the cabin of the aircraft 10, and/or the like. In such examples, the TMS 300 is configured to transfer heat from one or more fluids supporting the operation of the aircraft 10 (e.g., the oil of the lubrication system, the air of the cooling system and/or the environmental control system, and/or the like) to one or more other fluids supporting the operation of the aircraft 10 (e.g., the fuel supplied to the engines 100). However, in some other examples, the TMS 300 is configured to transfer heat between another fluid or component supporting the operation of the aircraft 10.

Although examples disclosed herein are described with reference to the aircraft 10 of FIG. 1, examples disclosed herein can be applicable to another type or configuration of aircraft that uses a thermal management system substantially similar to the TMS 300 of FIGS. 1-3. Thus, the present subject matter can be readily adaptable to another aircraft and/or another heat transfer application associated with another type of vehicle.

Figure 2:
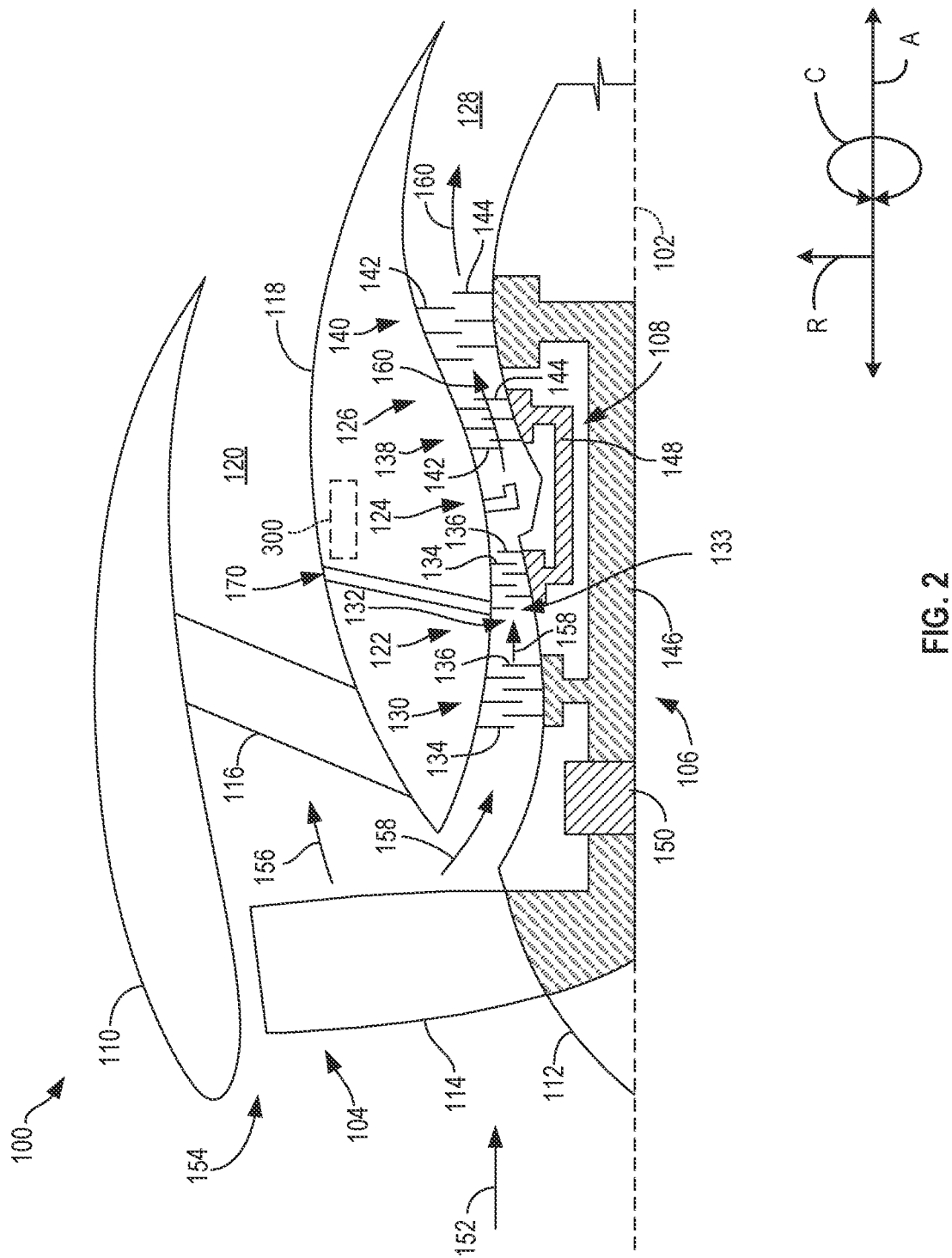
FIG. 2 is a schematic cross-sectional view of an example gas turbine engine of an aircraft.

FIG. 2 is a schematic cross-sectional view of an example gas turbine engine 100. In the illustrated example, the engine 100 is configured as a high-bypass turbofan engine. However, in some examples, the engine 100 is configured as a propfan engine, a turbojet engine, a turboprop engine, a turboshaft gas turbine engine, etc.

In general, the engine 100 extends along an axial centerline 102 and includes a fan 104, a low-pressure (LP) spool 106, and a high pressure (HP) spool 108 at least partially encased by an annular nacelle 110. More specifically, the fan 104 can include a fan rotor 112 and a plurality of fan blades 114 (one is shown) coupled to the fan rotor 112. In this respect, the fan blades 114 are circumferentially spaced apart and extend radially outward from the fan rotor 112. Moreover, the LP and HP spools 106, 108 are positioned downstream from the fan 104 along the axial centerline 102. As shown, the LP spool 106 is rotatably coupled to the fan rotor 112, which permits the LP spool 106 to rotate the fan blades 114. Additionally, a plurality of outlet guide vanes or struts 116 circumferentially spaced apart from each other and extend radially between an outer casing 118 surrounding the LP and HP spools 106, 108 and the nacelle 110. As such, the struts 116 support the nacelle 110 relative to the outer casing 118 such that the outer casing 118 and the nacelle 110 define a bypass airflow passage 120 positioned therebetween.

The outer casing 118 generally surrounds or encases, in serial flow order, a compressor section 122, a combustion section 124, a turbine section 126, and an exhaust section 128. In some examples, the compressor section 122 includes a low-pressure (LP) compressor 130 of the LP spool 106 and a high-pressure (HP) compressor 132 of the HP spool 108 positioned downstream from the LP compressor 130 along the axial centerline 102. Each compressor 130, 132 can, in turn, include one or more rows of compressor stator vanes 134 interdigitated with one or more rows of compressor rotor blades 136. As such, the compressors 130, 132 define a compressed air flow path 133 extending therethrough. Moreover, in some examples, the turbine section 126 includes a high-pressure (HP) turbine 138 of the HP spool 108 and a low-pressure (LP) turbine 140 of the LP spool 106 positioned downstream from the HP turbine 138 along the axial centerline 102. Each turbine 138, 140 can, in turn, include one or more rows of turbine stator vanes 142 interdigitated with one or more rows of turbine rotor blades 144.

Additionally, the LP spool 106 includes the low-pressure (LP) shaft 146 and the HP spool 108 includes a high-pressure (HP) shaft 148 positioned concentrically around the LP shaft 146. In such examples, the HP shaft 148 rotatably couples the turbine rotor blades 144 of the HP turbine 138 and the compressor rotor blades 136 of the HP compressor 132 such that rotation of the turbine rotor blades 144 of the HP turbine 138 rotatably drives the compressor rotor blades 136 of the HP compressor 132. As shown, the LP shaft 146 is directly coupled to the turbine rotor blades 144 of the LP turbine 140 and the compressor rotor blades 136 of the LP compressor 130. Furthermore, the LP shaft 146 is coupled to the fan 104 via a gearbox 150. In this respect, the rotation of the turbine rotor blades 144 of the LP turbine 140 rotatably drives the compressor rotor blades 136 of the LP compressor 130 and the fan blades 114.

In some examples, the engine 100 generates thrust to propel an aircraft. More specifically, during operation, air 152 enters an inlet portion 154 of the engine 100. The fan 104 supplies a first portion 156 of the air 152 to the bypass airflow passage 120 and a second portion 158 of the air 152 to the compressor section 122. The second portion 158 of the air 152 first flows through the LP compressor 130 in which the compressor rotor blades 136 therein progressively compress the second portion 158 of the air 152. Next, the second portion 158 of the air 152 flows through the HP compressor 132 in which the compressor rotor blades 136 therein continue to progressively compress the second portion 158 of the air 152. The compressed second portion 158 of the air 152 is subsequently delivered to the combustion section 124. In the combustion section 124, the second portion 158 of the air 152 mixes with fuel and burns to generate high-temperature and high-pressure combustion gases 160. Thereafter, the combustion gases 160 flow through the HP turbine 138 which the turbine rotor blades 144 of the HP turbine 138 extract a first portion of kinetic and/or thermal energy therefrom. This energy extraction rotates the HP shaft 148, which drives the HP compressor 132. The combustion gases 160 then flow through the LP turbine 140 in which the turbine rotor blades 144 of the LP turbine 140 extract a second portion of kinetic and/or thermal energy therefrom. This energy extraction rotates the LP shaft 146, which drives the LP compressor 130 and the fan 104 via the gearbox 150. The combustion gases 160 then exit the engine 100 through the exhaust section 128.

As mentioned above, the aircraft 10 can include the TMS 300 for transferring heat between fluids supporting the operation of the aircraft 10. In this respect, the TMS 300 can be positioned within the engine 100. For example, as shown in FIG. 2, the TMS 300 is positioned within the outer casing 118 of the engine 100. However, in some other examples, the TMS 300 is positioned at another location within the engine 100.

Furthermore, in some examples, the engine 100 defines a third-stream flow path 170. In general, the third-stream flow path 170 extends from the compressed air flow path 133 defined by the compressor section 122 to the bypass airflow passage 120. In this respect, the third-stream flow path 170 allows compressed a portion of the second portion 158 of the air 152 from the compressor section 122 to bypass the combustion section 124. More specifically, in some examples, the third-stream flow path 170 defines a concentric or non-concentric passage relative to the third-stream flow path 170 downstream of one or more of the compressors 130, 132 or the fan 104. The third-stream flow path 170 can be configured to selectively remove the second portion 158 of the air 152 from the third-stream flow path 170 via one or more variable guide vanes, nozzles, or other actuable flow control structures. In addition, as will be described below, in some examples, the TMS 300 transfers heat to the air flowing through the third-stream flow path 170. However, a pressure and/or a flow rate of a fluid (e.g., a heat exchange fluid such as a supercritical fluid (e.g., supercritical carbon dioxide ($sCO_2$), etc.)) within the TMS 300 limits a rate at which thermal energy is transferred between the air and the heat exchange fluid. Additionally, it is advantageous for the TMS 300 to produce the pressure and/or the flow rate with pumps that support axial thrusts of the shaft within the pump to improve the lifespan and/or efficiency of the pump(s) and the TMS 300.

Although examples disclosed herein are described with reference to the gas turbine engine 100 of FIG. 2, examples disclosed herein can be applicable to another type or configuration of engine that uses a thermal management system substantially similar to the TMS 300 of FIGS. 1-3. Thus, the present subject matter can be readily adaptable to another engine and/or another heat transfer application associated with another type of vehicle.

Figure 3:
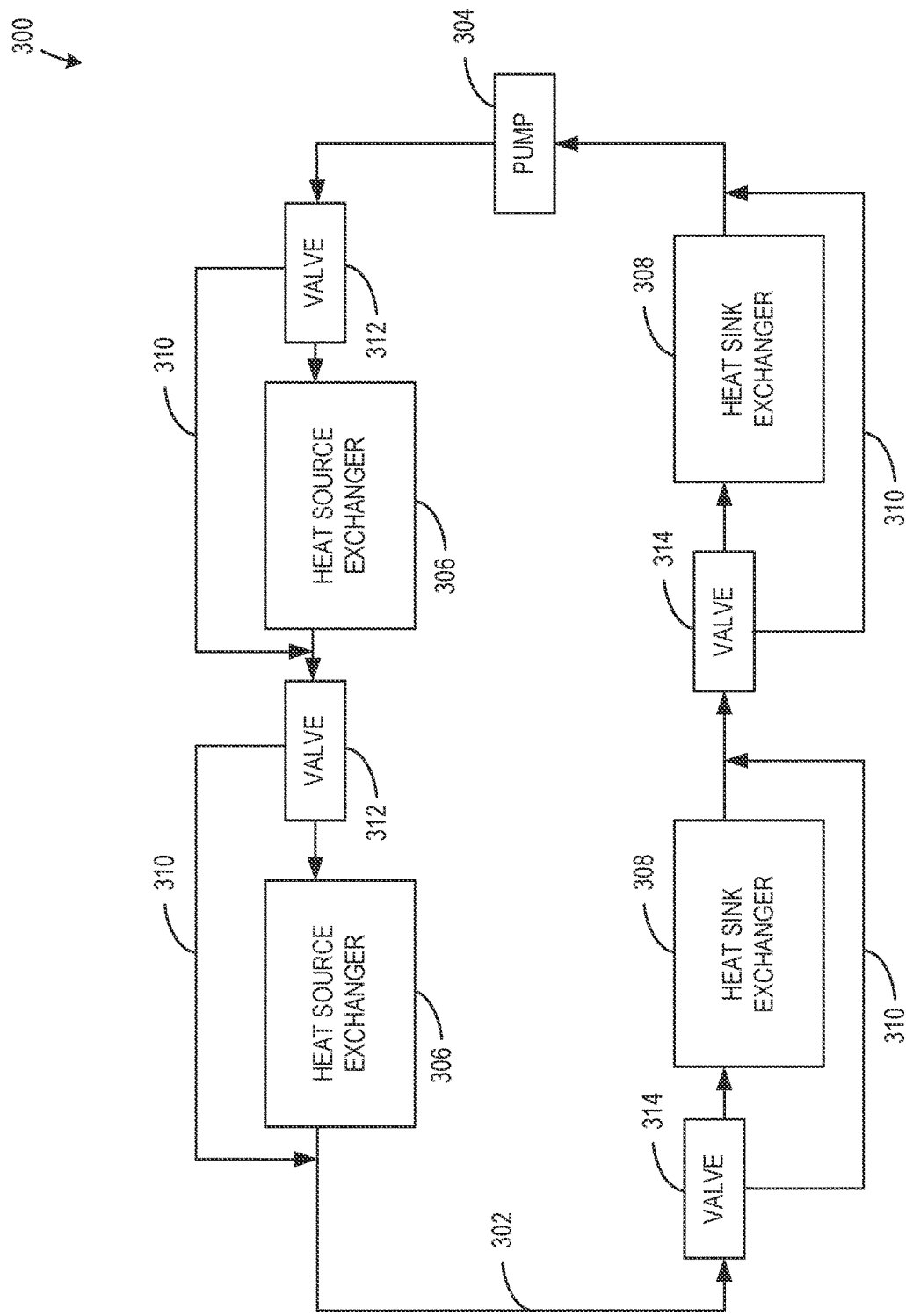
FIG. 3 is a schematic diagram of an example first thermal management system to transfer heat between fluids.

FIG. 3 is a schematic diagram of an example implementation of the TMS 300 for transferring heat between fluids. In general, the TMS 300 is discussed in the context of the aircraft 10 and the gas turbine engine 100 described above and shown in FIGS. 1 and 2. However, the TMS 300 can be implemented within another type of aircraft and/or another gas turbine engine of another configuration.

As shown, the TMS 300 includes a thermal transport bus 302. Specifically, in some examples, the thermal transport bus 302 is configured as one or more fluid conduits through which a fluid (e.g., a heat exchange fluid) flows. As described below, the heat exchange fluid flows through various heat exchangers such that heat is added to and/or removed from the heat exchange fluid. In this respect, the heat exchange fluid can be a working fluid, such as supercritical carbon dioxide, oil, liquid helium, etc. Moreover, in such examples, the TMS 300 includes a pump 304 configured to pump the heat exchange fluid through the thermal transport bus 302.

Additionally, the TMS 300 includes one or more heat source exchangers 306 arranged along the thermal transport bus 302. More specifically, the heat source exchangers 306 are fluidly coupled to the thermal transport bus 302 such that the heat exchange fluid flows through the heat source exchangers 306. In this respect, the heat source exchangers 306 are configured to transfer heat from fluids supporting the operation of the aircraft 10 to the heat exchange fluid, which cools the fluids supporting the operation of the aircraft 10. Thus, the heat source exchangers 306 add heat to the heat exchange fluid. Although two heat source exchangers 306 are illustrated in FIG. 3, the TMS 300 can include a single heat source exchanger 306 or multiple (e.g., two, three, five, etc.) heat source exchangers 306.

The heat source exchangers 306 can correspond to many configurations of heat exchangers that cool a fluid supporting the operation of the aircraft 10. In some examples, at least one of the heat source exchangers 306 is a heat exchanger of the lubrication system of the engine 100. In such examples, the heat source exchanger 306 transfers heat from the oil lubricating the engine 100 to the heat transfer fluid. In some other examples, at least one of the heat source exchangers 306 is a heat exchanger of the cooling system of the engine 100. In such examples, the heat source exchanger 306 transfers heat from the cooling air bled from the compressor section 122 (or a compressor discharge plenum) of the engine 100 to the heat transfer fluid. However, in some other examples, the heat source exchangers 306 correspond to other types of heat exchangers that cool a fluid supporting the operation of the aircraft 10.

Furthermore, the TMS 300 includes a plurality of heat sink exchangers 308 arranged along the thermal transport bus 302. More specifically, the heat sink exchangers 308 are fluidly coupled to the thermal transport bus 302 such that the heat exchange fluid flows through the heat sink exchangers 308. In this respect, the heat sink exchangers 308 are configured to transfer heat from the heat exchange fluid to other fluids supporting the operation of the aircraft 10, which heats the other fluids supporting the operation of the aircraft 10. Thus, the heat sink exchangers 308 remove heat from the heat exchange fluid. Although two heat sink exchangers 308 are illustrated in FIG. 3, the TMS 300 can include a single heat sink exchanger 308 or multiple (e.g., two, three, five, etc.) heat sink exchangers 308.

The heat sink exchangers 308 can correspond to many configurations of exchangers that heat a fluid supporting the operation of the aircraft 10. For example, at least of one of the heat sink exchangers 308 is a heat exchanger of the fuel system of the engine 100. In such examples, the fuel system heat sink exchanger 308 transfers heat from the heat transfer fluid to the fuel supplied to the engine 100. In some other examples, at least one of the heat sink exchangers 308 is a heat exchanger in contact with the first portion 156 of the air 152 flowing through the bypass airflow passage 120 of the engine 100. In such examples, the heat sink exchanger 308 transfers heat from the heat exchange fluid to the first portion 156 of the air 152 flowing through the bypass airflow passage 120.

In some examples, one or more of the heat sink exchangers 308 are configured to transfer heat to the air flowing through the third-stream flow path 170. In such examples, the heat exchanger(s) 308 is/are in contact with the air flow through the third-stream flow path 170. Thus, heat from the heat exchange fluid flowing through the thermal transport bus 302 can be transferred to the air flow through the third-stream flow path 170. The use of the third-stream flow path 170 as a heat sink for the TMS 300 provides one or more technical advantages. For example, the third-stream flow path 170 provides greater cooling than other sources of bleed air because a larger volume of air flows through the third-stream flow path 170 than other bleed air flow paths. Moreover, the air flowing through third-stream flow path 170 is cooler than the air flowing through other bleed air flow paths and the compressor bleed air. Additionally, the air in the third-stream flow path 170 is pressurized, which allows the heat sink exchangers 308 to be smaller than heat exchangers relying on other heat sinks within the engine. Furthermore, in examples in which the engine 100 is unducted, using the third-stream flow path 170 as a heat sink does not increase drag on the engine 100, unlike the use of ambient air (e.g., a heat exchanger in contact with air flowing around the engine 100). However, in some other examples, the heat sink exchangers 308 correspond to other types of heat exchangers that heat a fluid supporting the operation of the aircraft 10.

Moreover, in some examples, the TMS 300 includes one or more bypass conduits 310. Specifically, as shown, each bypass conduit 310 is fluidly coupled to the thermal transport bus 302 such that the bypass conduits 310 allow at least a portion of the heat exchange fluid to bypass the heat source exchangers 306 and/or the heat sink exchangers 308. In some examples, the heat exchange fluid bypasses one or more of the heat source exchangers 306 and/or the heat sink exchangers 308 to adjust the temperature of the heat exchange fluid within the thermal transport bus 302. The flow of example heat exchange fluid through the bypass conduits 310 is controlled to regulate the pressure of the heat exchange fluid within the thermal transport bus 302. In the illustrated example of FIG. 3, each heat source exchanger 306 and/or each heat sink exchanger 308 has a corresponding bypass conduit 310. However, in some other examples, other numbers of heat source exchangers 306 and/or heat sink exchangers 308 can have a corresponding bypass conduit 310 so long as there is at least one bypass conduit 310.

Additionally, in some examples, the TMS 300 includes one or more heat source valves 312 and one or more heat sink valves 314. In general, each heat source valve 312 is configured to control the flow of the heat exchange fluid through the corresponding bypass conduit 310 to bypass the corresponding heat source exchanger 306. Similarly, each heat sink valve 314 is configured to control the flow of the heat exchange fluid through the corresponding bypass conduit 310 to bypass the corresponding heat sink exchanger 308. In this respect, the valves 312, 314 are fluidly coupled to the thermal transport bus 302 and the corresponding bypass conduits 310. As such, the valves 312, 314 can be moved between fully and/or partially opened and/or closed positions to selectively occlude the flow of heat exchange through the bypass conduit 310.

The valves 312, 314 can be controlled based on the pressure and/or temperature of the heat exchange fluid within the thermal transport bus 302. More specifically, as indicated above, in certain instances, the pressure of the heat exchange fluid flowing through the thermal transport bus 302 can fall outside of a desired pressure range (examples provided below). When the pressure of the heat exchange fluid is too high, the TMS 300 can incur accelerated wear. In this respect, when the pressure of the heat exchange fluid within the thermal transport bus 302 exceeds a maximum or otherwise increased pressure value, one or more heat source valves 312 open. In such examples, at least a portion of the heat exchange fluid flows through the bypass conduits 310 instead of the heat source exchangers 306. Thus, less heat is added to the heat exchange fluid by the heat source exchangers 306, which reduces the temperature and, thus, the pressure of the fluid. In some examples, the maximum pressure value is between 3800 and 4000 pounds per square inch or less. In some examples, the maximum pressure value is between 2700 and 2900 pounds per square inch, such as 2800 pounds per square inch. In some other examples, the maximum pressure value is between 1300 and 1500 pounds per square inch, such as 1400 pounds per square inch. Such maximum pressure values generally prevent the TMS 300 from incurring accelerated wear.

In some examples, the maximum pressure value is set prior to and/or during operation based on parameters (e.g., materials utilized, pump 304 design, aircraft 10 design, gas turbine engine 100 design, heat exchange fluid, etc.) associated with the TMS 300. The example maximum pressure value can be adjusted relative to the pressure capacities of the thermal transport bus 302, the pump 304, the heat source exchangers 306, the heat sink exchangers 308, the bypass conduits 310, and/or the valves 312, 314.

Conversely, when the pressure of the heat exchange fluid is too low, the pump 304 can experience operability problems and increased wear. As such, when the pressure of the heat exchange fluid within the thermal transport bus falls below a minimum or otherwise reduced pressure value, one or more heat sink valves 314 open. In such examples, at least a portion of the heat exchange fluid flows through the bypass conduits 310 instead of the heat sink exchangers 308. Thus, less heat is removed from the heat exchange fluid by the heat sink exchangers 308, which increases the temperature and, thus, the pressure of the fluid. In some examples, the minimum pressure value is 1070 pounds per square inch or more. In some examples, the minimum pressure value is between 1150 and 1350 pounds per square inch, such as 1250 pounds per square inch. In some other examples, the minimum pressure value is between 2400 and 2600 pounds per square inch, such as 2500 pounds per square inch. Such minimum pressure values are generally utilized when the heat exchange fluid in a supercritical state (e.g., when the heat exchange fluid is carbon dioxide).

As such, the TMS 300 can be configured to operate such that the pressure of the heat transport fluid is maintained with a range extending between the minimum and maximum pressure values. In some examples, the range extends from 1070 to 4000 pounds per square inch. Specifically, in one example, the range extends from 1250 to 1400 pounds per square inch. In some other examples, the range extends from 2500 to 2800 pounds per square inch.

Accordingly, the operation of the pump 304 and the valves 312, 314 allows the TMS 300 to maintain the pressure of the heat exchange fluid within the thermal transport bus 302 within a specified range of values as the thermal load placed on the TMS 300 varies.

Furthermore, the example pump 304 drives the flow of the heat exchange fluid through the TMS 300. In some examples, the TMS 300 includes one pump 304 or multiple pumps 304 depending on the desired flow rate, delta pressure across the pump 304, and/or the kinetic energy loss of the heat exchange fluid in the thermal transport bus 302. For example, the pump 304 can increase the output pressure head to accelerate the flow of the heat exchange fluid to a first flowrate. As the heat exchange fluid passes through the thermal transport bus 302, the example kinetic energy of the heat exchange fluid dissipates due to friction, temperature variations, etc. Due to the kinetic energy losses, the heat exchange fluid decelerates to a second flow rate at some point upstream of the pump 304. When the example second flow rate is below a desired operating flow rate of the heat exchange fluid, the pump 304 can either be of a different architecture that outputs a higher first flow rate, or one or more additional pumps 304 can be included in the TMS 300.

Figure 4:
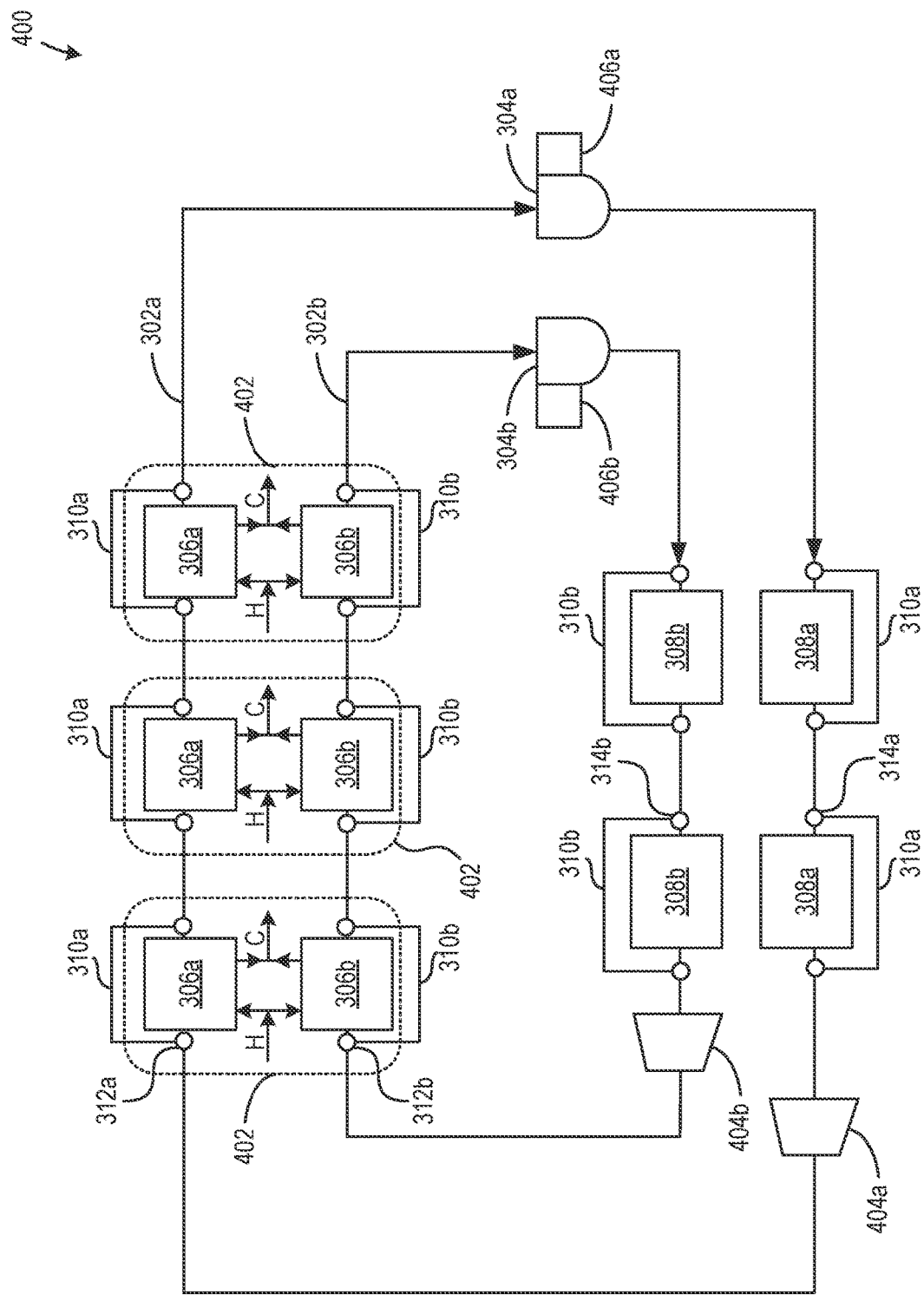
FIG. 4 is a schematic diagram of an example second thermal management system to transfer heat between fluids.

FIG. 4 is a schematic diagram of an example implementation of a second thermal management system 400 (TMS 400) for transferring heat between fluids. In general, the TMS 400 is discussed in the context of the aircraft 10 and the gas turbine engine 100 described above and shown in FIGS. 1 and 2. However, the TMS 400 can be implemented within another type of aircraft and/or another gas turbine engine of another configuration.

As shown, the TMS 400 generally includes a first flow loop 302a and a second flow loop 302b. The first and second flow loops 302a-b further include a first pump 304a and a second pump 304b to move the heat exchange fluid (e.g., supercritical carbon dioxide, etc.) through the first and second flow loops 302a-b, respectively. The first flow loop 302a further includes at least one first heat source exchanger 306a and at least one first heat sink exchanger 308a. The second flow loop 302b further includes at least one second heat source exchanger 306b and at least one second heat sink exchanger 308b. The first pump 304a (first flow loop 302a) and the second pump 304b (second flow loop 302b) generate a closed-loop flow of the heat exchange fluid in the TMS 400. Although three first and second heat source exchangers 306a-b are illustrated in FIG. 4, more or fewer (e.g., one, two, five, etc.) first and second heat source exchangers 306a-b can be included in the TMS 400. Similarly, although two first and second heat sink exchangers 308a-b are illustrated in FIG. 4, more or fewer (e.g., one, three, five, etc.) first and second heat sink exchangers 308a-b can be included in the TMS 400. In general, it can be appreciated that the first and second flow loops 302a-b run parallel to each other, and that the TMS 400 of FIG. 4 includes substantially similar elements as the TMS 300 of FIG. 3, as shown with like reference numbers.

As depicted in FIG. 4, the first and second heat source exchangers 306a-b are configured with common heat sources 402 such that each of the first heat source exchangers 306a and the second heat source exchangers 306b provide independent and isolated heat removal capability (via the heat exchange fluid) to the common heat sources 402. The common heat sources 402 can include, for example, a main lubrication system heat exchanger for transferring heat from the main lubrication system; a compressor cooling air (CCA) system heat source exchanger for transferring heat from the compressor (e.g., high-pressure compressor) of gas turbine engines; an active thermal clearance control (ACC) system heat source exchanger for transferring heat from the turbine casing of the gas turbine engines; a generator lubrication system heat source exchanger for transferring heat from the electric machine thermal system; an environmental control system (ECS) heat exchanger for transferring heat from air supplied to the main cabin; and/or an electronics cooling system heat exchanger for transferring heat from the electronics cooling system.

Although, the common heat sources 402 associated with each of the pairs of first and second heat source exchangers 306a-b are identified by same reference numbers, the common heat sources 402 can be the same and/or different types of heat sources described above. Additionally or alternatively, one common heat source 402 can transfer heat to two or more pairs of first and second heat source exchangers 306a-b. Similarly, two or more common heat sources 402 can transfer heat to one pair of first and second heat source exchangers 306a-b. Thus, although three common heat sources 402 are illustrated in FIG. 4, there can be a single common heat source 402 or multiple common heat sources 402 included in the TMS 400.

In general, the first and second heat source exchangers 306a-b are configured with the common heat sources 402 and are arranged in parallel. The hot medium (labeled "H" in the figures) splits and flows through the first and second heat source exchangers 306a-b in parallel, and subsequently combines into a single cold medium flow (labeled "C" in the figures). In some examples, the common heat sources 402 can include an output/bleed port and in input port (not shown in the example view of FIG. 4). The bleed port can provide a flow of hot fluid to the first and second heat source exchangers 306a-b in parallel, and the input port can receive cooled fluid from the first and second heat source exchangers 306a-b. However, in some examples, the first and second heat source exchangers 306a-b are arranged in series with each of the common heat sources 402.

The first and second flow loops 302a-b include the heat sink exchangers 308a-b to transfer heat from the heat exchange fluid to another fluid (e.g., atmosphere, fuel, compressed air stream, expanded air stream, etc.). For example, the heat sink exchangers 308a-b can include at least one of a ram air heat exchanger, a fuel heat exchanger, a fan stream heat exchanger, and/or a bleed air heat exchanger. The ram air heat exchanger can be configured as an "air to heat exchange fluid" heat exchanger integrated into one or both of the engine 100 and/or the aircraft 10. During operation, the ram air heat exchanger may remove heat from the heat exchange fluid by flowing a certain amount of intake air over the ram air heat exchanger. Additionally, the fuel heat exchanger can be configured as a "liquid to heat exchange fluid" heat exchanger wherein heat from the heat exchange fluid is transferred to a stream of liquid fuel for the engine 100. Moreover, the fan stream heat exchanger can generally be an "air to heat exchange fluid" heat exchanger to transfer heat from the heat exchange fluid to bypass air in the engine 100. Further, the bleed air heat exchanger can generally be an "air to heat exchange fluid" heat exchanger to transfer heat from the heat exchange fluid to bleed air from the LP compressor section of the engine 100.

As illustrated in FIG. 4, the first heat sink exchangers 308a are configured in series and the second heat sink exchangers 308b are configured in series within the first and second flow loops 302a-b, respectively. In some examples, two or more of the first and second heat sink exchangers 308a-b are arranged in parallel flow within the first and second flow loops 302a-b, respectively. As also illustrated in FIG. 4, the heat exchange fluid flowing through the first heat sink exchangers 308a does not mix with the heat exchange fluid flowing through the second heat sink exchangers 308b. Thus, it can be appreciated that the first and second flow loops 302a-b provide redundant and isolated heat removal capacity to the plurality of common heat sources 402.

As depicted in FIG. 4, the first and second flow loops 302a-b include first bypass conduits 310a, second bypass conduits 310b, first heat source valves 312a, second heat source valves 312b, first heat sink valves 314a, and second heat sink valves 314b. Similar to the TMS 300 of FIG. 3, the first and second bypass conduits 310a-b, the first and second heat source valves 312a-b, and the first and second heat sink valves 314a-b provide the TMS 400 with the capability to selectively isolate one or more of the first and/or second heat source and/or sink exchangers 306a, 306b, 308a, 308b to regulate the pressure the TMS 400 or to account for failures therein.

The first flow loop 302a is isolated from the second flow loop 302b such that the heat exchange fluid moving through the first flow loop 302a does not mix with the heat exchange fluid moving through the second flow loop 302b. For example, although the first heat source exchangers 306a and the second heat source exchangers 306b can be configured to remove heat from the same common heat sources 402, the first and second heat source exchangers 306a-b are structurally independent and fluidly isolated such that the heat exchange fluid moving through the respective first and second heat source exchangers 306a-b does not mix.

Referring still to FIG. 4, the example thermal management system 400 may utilize a refrigeration cycle to remove heat more efficiently from the various first and second heat source exchangers 306a-b. Specifically, the first and second pumps 304a-b can be configured as first and second compressors to compress gaseous or supercritical heat exchange fluid, and the first and second flow loops 302a-b can include first and second expansion devices 404a-b, respectively. The first and second expansion devices 404a-b are included in the TMS 400 to expand the heat exchange fluid, which reduces the pressure and temperature thereof. In some examples, the first and second pumps 304a-b are each powered by drive systems 406a-b, respectively. In some examples, the drive systems 406a-b are electric motors, such as direct current (DC) motors. In some other examples, the drive systems 406a-b include a gearing system (gearbox) mechanically coupled to a rotary component of the engine 100, such as the LP spool 106 or the HP spool 108. Although separate first and second drive systems 406a-b are depicted, in some examples, a single drive system (such as a single electric motor) can provide mechanical power to both the first and second pumps 304a-b.

Figure 5:
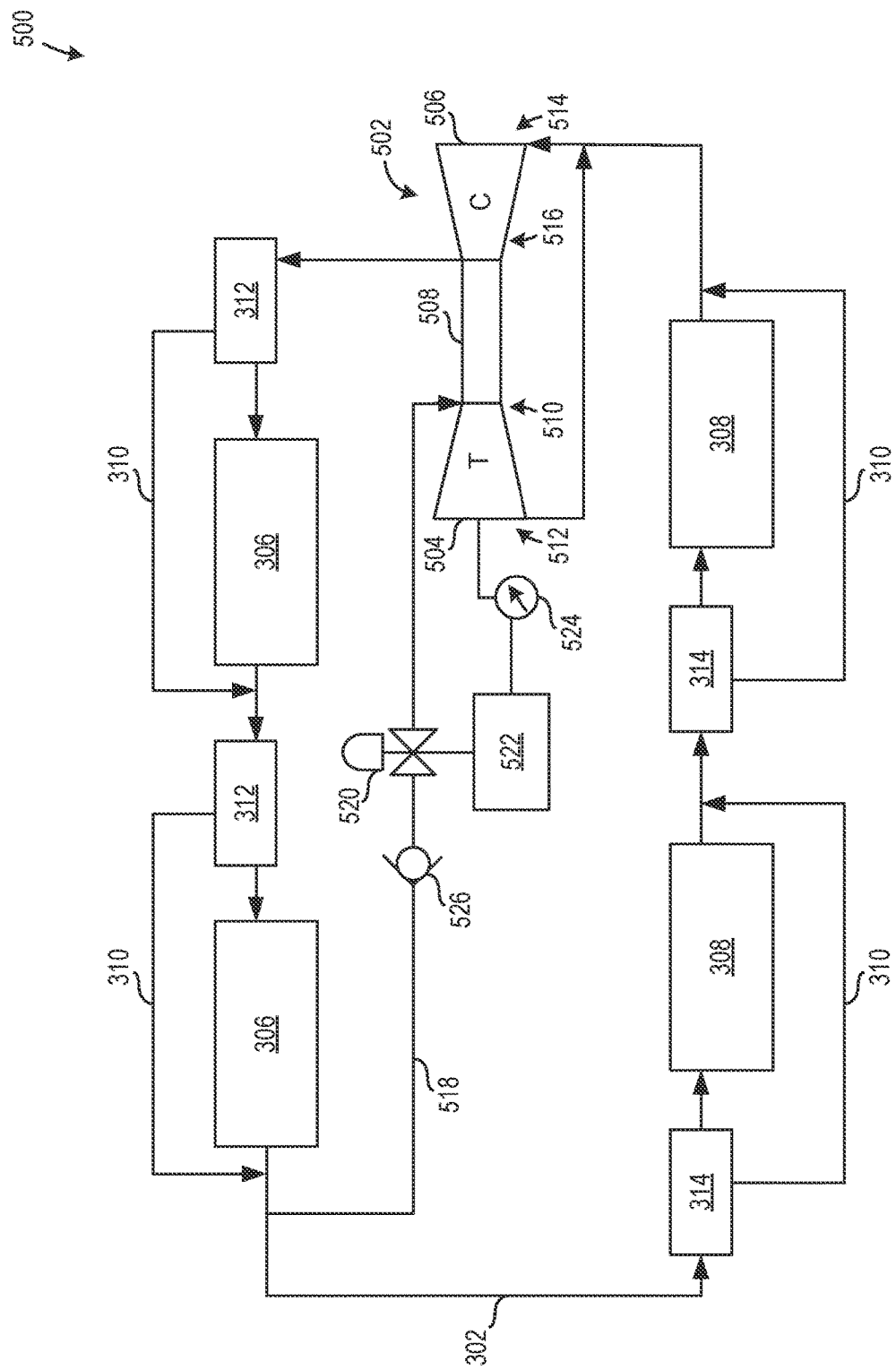
FIG. 5 is a schematic diagram of an example first heat driven thermal management system in accordance with teachings disclosed herein.

Turning to FIG. 5, a schematic diagram of an example first heat driven thermal management system 500 (TMS 500) is provided in accordance with teachings disclosed herein. In general, the TMS 500 is discussed in the context of the aircraft 10 and the gas turbine engine 100 described above and shown in FIGS. 1 and 2. However, the TMS 500 can be implemented within another type of aircraft and/or another gas turbine engine of another configuration.

The TMS 500 is configured in a single loop and includes the thermal transport bus (TTB) 302, the heat source exchangers 306, the heat sink exchangers 308, the bypass conduits 310, the heat source valves 312, and the heat sink valves 314 similar to the TMS 300 of FIG. 3. In some examples, the TMS 500 can be configured in a parallel flow loop similar to the TMS 400 and can include the same elements illustrated in FIG. 4. The TMS 500 includes a turbomachine 502 having a turbine 504 that takes in high temperature (e.g., 1300 degrees Rankine (° R) (722 Kelvin (K)), 1400° R (778 K), 1500° R (833 K), etc.) and high pressure (e.g., 2950 pounds per square inch (psi), 3000 psi, 3050 psi, etc.) heat exchange fluid (e.g., sCO2, He—Xe, LHe2, etc.), extracts power from the heat exchange fluid, and discharges low temperature (e.g., 600° R, 700° R, 800° R, etc.) and low pressure (e.g., 2900 psi, 2950 psi, 3000 psi, etc.) heat exchange fluid.

Upstream of the turbine 504, the heat exchange fluid is diverted from the TTB 302 at a first point at which the pressure and temperature of the heat exchange fluid is substantially high, such as just downstream (e.g., within one meter) of one of the heat source exchangers 306. In some examples, the first point is just downstream of a last one of the heat source exchangers 306 in flow serial order. In general, the first point is positioned downstream of the heat source exchangers 306 and upstream of the heat sink exchangers 308. It can be appreciated that the first point is positioned where the thermal energy of the heat exchange fluid is most likely to be at optimum (highest) level(s) such that the turbine 504 can extract the maximum amount of (highest possible) energy for power generation.

The TMS 500 includes a compressor to pressurize the heat exchange fluid in the TTB 302. The turbine 504 and the compressor 506 are rotatably interlocked and/or mounted on a shaft 508. Thus, the turbine 504 extracts the power from the heat exchange fluid and transfers the power to the compressor 506 via the shaft 508. In other words, the turbine 504 can convert thermal energy of the heat exchange fluid into mechanical work to rotate the compressor 506 via the shaft 508. A portion (e.g., 50%, 60%, 70%, etc.) of the heat exchange fluid in the TTB 302 is diverted to the turbine 504, which converts thermal energy (heat) of the heat exchange fluid into mechanical energy (work) to be used to power a pump (e.g., the compressor 506). The turbine 504 can extract enough power (e.g. 3200 Watts (W), 3240 W, 3500 W, etc.) to cause the compressor 506 to sufficiently pressurize and drive the heat exchange fluid through the TTB 302. Furthermore, the turbine 504 can extract sufficient power such that the compressor 506 can overcome pressure drops within the TMS 500 due to friction in the TTB 302, energy loss in the heat sink exchangers 308, etc. Thus, it can be appreciated that the turbomachine 502 enables the TMS 500 to start-up, operate, or otherwise be powered self-sufficiently using the heat that the heat exchange fluid absorbs. More specifically, the turbine 504 can power the compressor 506 rather than an electric motor to conserve weight and operate the TMS 500 more efficiently, relative to the TMS 300 and/or the TMS 400, which use electric motors or other external power sources to drive the pump(s) 304, 304a, and/or 304b. In some examples, the turbine 504 extracts an excessive amount of power (e.g., 4000 W, 5000 W, 6000 W, etc.), which can cause the compressor 506 to operate at excessive speeds. Such speeds may cause the heat exchange fluid to be over pressurized, which may cause damage to the TMS 500. In some examples (described below), the turbomachine 502 can convert some of such excess mechanical power into electrical power for concurrent or future use.

In some examples, the turbine 504 is said to "expand" the heat exchange fluid, meaning that the pressure of the heat exchange fluid reduces (decompresses) while flowing through the turbine 504, which also causes the temperature to decrease. In general, the turbine 504 expands the diverted portion of the heat exchange fluid and reintroduces the portion back to the TTB 302 at a second point at which the pressure and temperature of the heat exchange fluid is substantially low. In some examples, the second point is just upstream (e.g., within one meter) of the compressor 506. In some other examples, the second point is just downstream of a last one of the heat sink exchangers 308 in flow serial order. In general, the second point is positioned downstream of the heat sink exchangers 308 and upstream of the compressor 506.

The heat exchange fluid expands while flowing through the turbine 504 from a first inlet 510 to a first outlet 512. In some examples, the turbine 504 is an axial turbine and the heat exchange fluid enters the first inlet 510 and exits the first outlet 512 parallel to the shaft 508. In such examples, the turbine 504 includes consecutive stages of rotor blades and stator vanes. The first inlet 510 can be one or more stages substantially optimized for high pressures (e.g., 3000 psi, 3100 psi, 3200 psi, etc.), and the first outlet 512 can be one or more stages substantially optimized for low pressures (e.g., 2800 psi, 2900 psi, 3000 psi, etc.). The rotor blades can be mounted on a rotor disk coupled to the shaft 508, and the stator vanes can be mounted on a stationary stator disk or another static structure in the turbine 504. In some examples, the turbine 504 is a centrifugal turbine in which the heat exchange fluid enters the first inlet 510 radial to the impeller shaft 508 and exits the first outlet 512 parallel to the shaft 508. In such examples, the turbine 504 can include an expeller coupled to the shaft 508 that rotates when high pressure fluid encounters the expeller substantially orthogonal to an axis of rotation. In some examples, the first outlet 512 is connected to the second point of the TTB 302 via one or more outlets and/or flowlines.

In general, the heat exchange fluid can compress while flowing through the compressor 506 from a second inlet 514 to a second outlet 516. In some examples, the compressor 506 is an axial compressor and the heat exchange fluid enters the second inlet 514 and exits the second outlet 516 parallel to the shaft 508. In such examples, the second inlet 514 can be one or more stages (set(s) of one stator disk following one rotor disk) substantially optimized for low pressures (e.g., 2800 psi, 2900 psi, 3000 psi, etc.), and the second outlet 516 can be one or more stages substantially optimized for high pressures (e.g., 2900 psi, 3000 psi, 3100 psi, etc.). When the turbine 504 and the compressor 506 are of example axial configurations, the shaft 508 can from the a distal end of the turbine 504 (e.g., the first outlet 512) to a distal end of the compressor 506 (e.g., the second inlet 514). In some examples, the compressor 506 is a centrifugal compressor and the heat exchange fluid enters the second inlet 514 axially (substantially parallel to the shaft 508) and exits the second outlet 516 radially (substantially perpendicular to the shaft 508). In such examples, the second inlet 514 includes a port (e.g., pipe, flowline, tube, etc.) connected to an impeller, which includes impeller vanes to pressurize and accelerate the fluid radially outward into in the second outlet 516 (e.g., volute chamber). In some examples, the first outlet 512 is connected to the TTB 302 via one or more outlets and/or flowlines.

Whether the turbine 504 and/or the compressor 506 have axial or centrifugal configurations, the turbomachine 502 can be designed as a thrust balanced system. In other words, axial thrust generated by fluid pressure on the first inlet 510 of the turbine 504 acts in a first direction, and axial thrust generated by fluid pressure on the second inlet 514 of the compressor 506 acts in a second direction opposite the first direction. Therefore, the axial thrusts at the turbine 504 and the compressor 506 offset each other, and the turbomachine 502 does not generate a substantially large thrust in either the first direction or the second direction. In some examples, the turbomachine 502 is completely thrust balanced, and no thrust is generated in either the first direction or the second direction due to fluid pressures. In some other examples, a substantially small thrust is generated such that structures to support the turbomachine 502 do not become strained beyond a yield stress point.

Generally, it should be appreciated that, although arrows leading to/from the turbine 504 and the compressor 506 are illustrated as substantially orthogonal to the shaft 508, flowlines leading to/from the inlets 510, 514 and the outlets 512, 516 can be substantially orthogonal or parallel to the shaft 508 and/or another combination thereof. Although the illustrated example of FIG. 5 shows the first inlet 510 and second outlet 516 proximal to the shaft 508 and the first outlet 512 and the second inlet 514 distal to the shaft 508, in some examples, the turbine 504 and the compressor 506 (axial turbine and axial compressor) can be oriented such that the first inlet 510 and second outlet 516 are distal to the shaft 508, the first outlet 512 and the second inlet 514 are proximal to the shaft 508, and/or another combination thereof.

In terms of a primary flow path of the heat exchange fluid, the TTB 302 (primary flowline) originates at the second outlet 516 and terminates (loops back to) at the second inlet 514 of the compressor 506. As mentioned previously, a portion of the heat exchange fluid diverts from the TTB 302 at the first point, at which point the portion of the fluid enters a secondary flowline 518 (secondary flowline). Since the pressure at the first point is higher than the pressure at the second point, the portion of the heat exchange fluid is pulled into the secondary flowline 518 via pressure driven flow. The heat exchange fluid in the secondary flowline 518 is permitted to the turbine 504 at a flowrate, and the flowrate is determined based on opening of a control valve 520, the diameter(s) of the secondary flowline 518, the properties of the heat exchange fluid (e.g., temperature, pressure, density, viscosity, etc.), etc. The flowrate of the heat exchange fluid at the turbine 504 can determine the rate at which the turbomachine 502 operates, and thus, the pressure output of the compressor 506. In general, the rotational speed of the turbomachine 502, the flowrate of the heat exchange fluid in the TTB 302, and/or the pressure of the heat exchange fluid in the TTB 302 can determine a position (e.g., opened, closed, partially opened, etc.) of the control valve 520.

In some examples, the control valve 520 is a pneumatic valve that is hydraulically actuated via the pressure of the heat exchange fluid in the TTB. The term "pneumatic" is used herein to describe a mechanism containing or being operated by a supercritical fluid under pressure. The term "hydraulic" is used herein to describe a movement or a force caused by supercritical fluid under pressure. A hydraulic supply line can lead from the TTB 302 and/or the secondary flowline 518 to the control valve 520 such that if the pressure within the TTB 302 satisfies (e.g., exceeds) a pressure threshold, the hydraulic force of the heat exchange fluid can cause the control valve 520 to close. In the illustrated example of FIG. 5, the control valve 520 is an electronic valve operated by a control system 522 (discussed below with reference to FIG. 8). For example, the control valve 520 is an automatic valve, such as a quick opening valve, that can switch between fully open and fully closed states substantially instantaneously to essentially turn the flow on or off. In another example, the control valve 520 is a proportional valve that can generate variable apertures (e.g., partial effective areas) ranging from a fully open area to a fully closed area to adjust the flowrate gradually.

The TMS 500 illustrated in FIG. 5 includes a speed sensor 524 to measure an angular velocity of the turbomachine 502. In some examples, the speed sensor 524 is a tachometer coupled to the shaft 508 to detect the rotations per minute (rpm) of the turbine 504 and/or the compressor 506. The control system 522 can be an automatic and/or closed loop controller (e.g., proportional-integral-derivative (PLD) controller, full authority digital electronics controller (FADEC), etc.) that obtains an input signal (e.g., electronic signal, etc.) from the speed sensor 524 representing the speed of the turbomachine 502 and sends an output (e.g., control signal, etc.) to the control valve 520 representing a position of an actuator (e.g., plunger, shaft, valve, gate, ball, globe, etc.). In other words, the control system 522 causes the control valve 520 to open or close (fully or partially) based on the speed of the shaft 508, the turbine 504, and/or the compressor 506.

In an example use case, the aircraft 10 begins operation and the engine 100 and/or other onboard elements begin heating the heat exchange fluid in the TMS 500 via the heat source exchangers 306. As the temperature rises, the fluid pressure increases and causes the heat exchange fluid to flow in the direction of the arrows as illustrated in FIG. 5. Before operation or during startup of the TMS 500, the control system 522 can cause the control valve to open and permit the heat exchange fluid to enter the first inlet 510 via the secondary flowline 518. As the turbine 504 extracts energy from the fluid, rotates the shaft 508, and powers the compressor 506, the control system 522 obtains rotational speed measurements from the speed sensor 524. When the turbomachine 502 (e.g., the shaft 508) spins at a rate that satisfies (e.g., exceeds) a first speed threshold (e.g., 35000 rpm, 40000 rpm, 45000 rpm, etc.), the control system 522 causes the control valve 520 to close. In some examples, the control system 522 causes the control valve 520 to partially close, reduce the flowrate in the secondary flowline 518, and progressively reduce the rotational speed of the turbomachine 502. However, in general, the control valve 520 fully closes when the rotational speed satisfies the first speed threshold to slow the turbine 504 as quickly as possible to avoid damages to the TMS 500 and the elements therein. In some examples, the first speed threshold corresponds to a rotational speed of the compressor 506 at which the output pressure and/or flowrate of the compressor 506 can cause accelerated wear and/or catastrophic damage to the TTB 302, the heat source exchangers 306, heat sink exchangers 308, etc.

The TMS 500 further includes a check valve 526 to ensure that the heat exchange fluid flows in one direction and to prevent backflow in the secondary flowline 518. As illustrated in FIG. 5, the check valve 526 is positioned upstream of the control valve 520 such that, if the turbomachine 502, the control system 522, and/or the control valve 520 cease operation and cause a pressure build up in the secondary flowline 518, the heat exchange fluid does not reverse flow toward the first point of the TTB 302. Thus, if fluid pressure downstream of the check valve 526 is equal to or greater than the fluid pressure upstream, the check valve 526 closes and obstructs the reversed flow. The check valve can be a two-port valve that operates automatically without aid of the control system 522, such as a ball check valve, a diaphragm check valve, a lift-check valve, an in-line check valve, etc.

Figure 6:
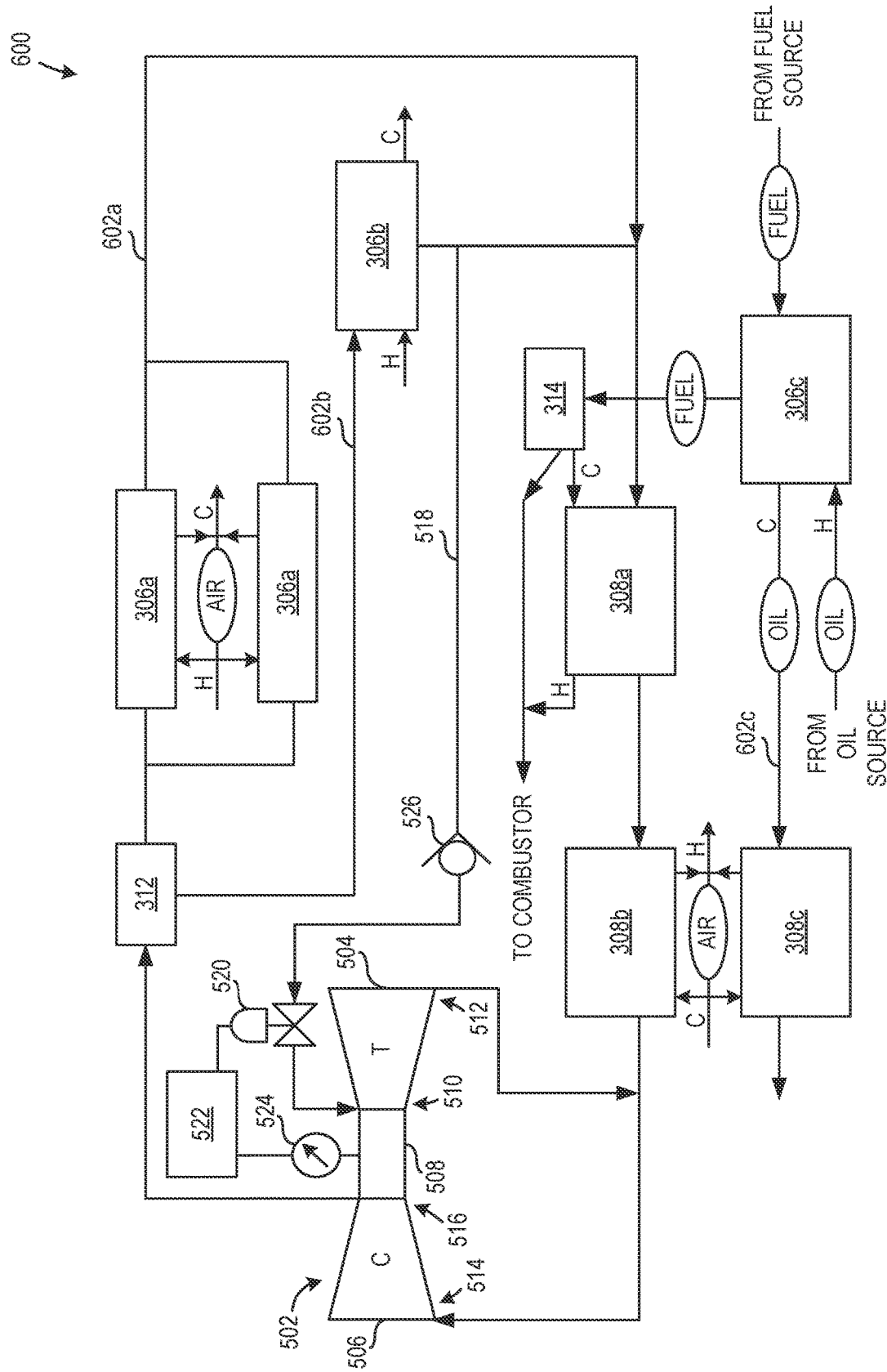
FIG. 6 is a schematic diagram of an example second heat driven thermal management system in accordance with teachings disclosed herein.

Turning now to FIG. 6, a schematic diagram of an example second heat driven thermal management system 600 (TMS 600) is provided in accordance with teachings disclosed herein. In general, the TMS 600 is discussed in the context of the aircraft 10 and the gas turbine engine 100 described above and shown in FIGS. 1 and 2. However, the TMS 600 can be implemented within another type of aircraft and/or another gas turbine engine of another configuration.

The TMS 600 is configured in a single loop and includes a first thermal transport bus (TTB) 602a, a second TTB 602b, and a third TTB 602c. Similar to the TMS 500 of FIG. 5, the first TTB 602a originates at the second outlet 516 and loops back to the second inlet 514 of the compressor 506. The TMS 600 also includes the second TTB 602b to branch off the first TTB 602a such that a portion of the first TTB 602a runs concurrently with a portion of the second TTB 602b. Additionally, the TMS 600 includes a third TTB 602c that can run parallel to the first TTB 602a.

The TMS 600 includes first heat source exchangers 306a, a second heat source exchanger 306b, and a third the heat source exchanger 306c. In some examples the first heat source exchangers 306a are CCA heat exchangers that operate concurrently, absorb heat from compressed bleed air at the compressor section 122 of the gas turbine engine 100, and direct cooled compressed air to the turbine section 126 of the engine 100. In some examples, the second heat source exchanger 306b is a waste heat recovery (WHR) heat exchanger that draws heat from other, hotter element(s) of the engine 100 (e.g., the combustion section 124, HP turbine 138, etc.). As such, the first point at which the secondary flowline 518 diverts from the second TTB 602b is just downstream of the second heat source exchanger 306b because the second heat source exchanger 306b can transfer the most heat to the heat exchange fluid. However, in some other examples, the second heat source exchanger 306b is not included in the TMS 600, and the first point is located just downstream of the first heat source exchangers 306a. Similar to the TMS 300, TMS 400, and/or the TMS 500, the TMS 600 includes the heat source valve 312 to selectively bypass the first or second heat source exchangers 306a-b.

In some examples, the third heat source exchanger 306c is a fuel cooled oil cooler (FCOC) heat exchanger that is connected to the third TTB 602c and the heat sink valve 314.

The third heat source exchanger can heat fuel (e.g., Jet A, Jet A-1, etc.) via heated oil and transmit the heated fuel to the heat sink valve 314. The heat sink valve 314 can either send the heated fuel to a combustor (e.g., the combustion section 124) or to a first heat sink exchanger 308a to be further heated before flowing to the combustor. The TMS 600 also includes a second heat sink exchanger 308b to further remove heat from the heat exchange fluid in the first TTB 602a and to add said heat to bleed air in the engine 100, the compressor section 122, etc. In parallel with the second heat sink exchanger 308b, the TMS 600 includes a third heat sink exchanger 308c to remove heat from the oil and further add heat to the bleed air.

Other than those mentioned above with reference to FIG. 6, the TMS 600 includes the same elements as the TMS 500 of FIG. 5. Thus, the TMS 600 includes the turbomachine 502, which further includes the turbine 504 and the compressor 506 mounted on the shaft 508. Moreover, the turbine 504 of the TMS 600 includes the first inlet 510 and the outlet 512, and the compressor 506 of the TMS 600 includes the second inlet 514 and the second outlet 516. The TMS 600 also includes the secondary flowline 518 to transmit the high energy heat exchange fluid to the turbine 504, the control valve 520 to permit/restrict flow to the turbine 504, and the control system 522 to determine when to open/close the control valve 520 based on the rotational speed of the shaft 508 measured with the speed sensor 524. Lastly, the TMS 600 includes the check valve 526 in the secondary flowline 518 to prevent backflow of the heat exchange fluid therein.

Although the first, second, and third heat source exchangers 306a-c and the first, second, and third heat sink exchangers 308a-c are included in the TMS 600, more or fewer heat source and/or heat sink exchangers can be included therein. Similarly, the TMS 600 can include more or fewer TTBs than the first, second, and third TTBs 602a-c based on the operational requirements of the engine 100, aircraft 10, or another gas turbine engine or aircraft. As such, it should be appreciated that example heat driven thermal management systems disclosed herein can include one turbomachine 502 to drive one or more concurrent TTBs, such as the first and second TTB 602a-b of FIG. 6. Additionally or alternatively, example heat driven thermal management systems disclosed herein can include a plurality of turbomachines 502 to drive the heat exchange fluid through a plurality of TTBs that run in parallel.

Figure 7:
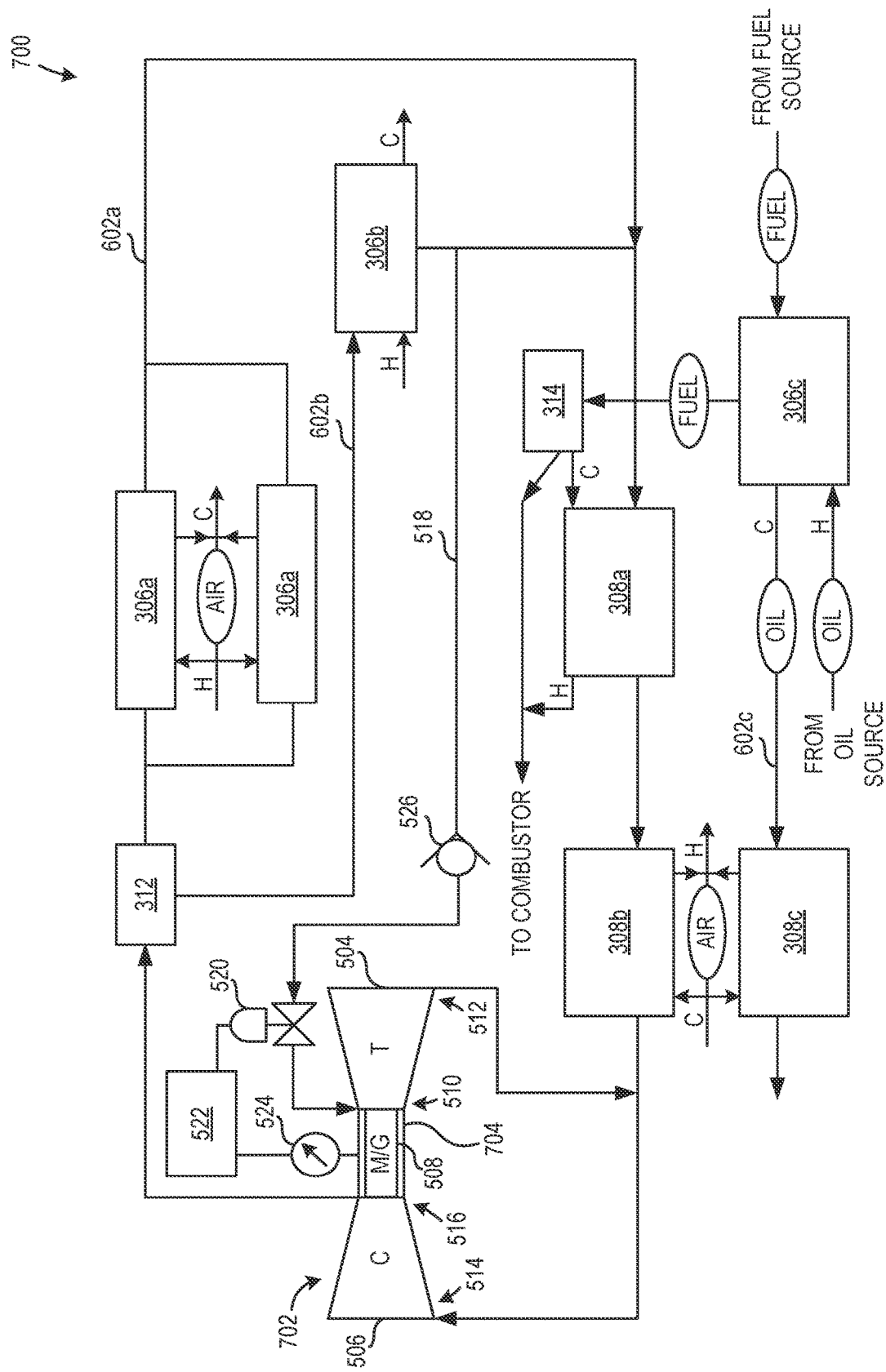
FIG. 7 is a schematic diagram of an example third heat driven thermal management system in accordance with teachings disclosed herein.

Turning now to FIG. 7, a schematic diagram of an example third heat driven thermal management system 700 (TMS 700) is provided in accordance with teachings disclosed herein. In general, the TMS 700 is discussed in the context of the aircraft 10 and the gas turbine engine 100 described above and shown in FIGS. 1 and 2. However, the TMS 700 can be implemented within another type of aircraft and/or another gas turbine engine of another configuration.

In general, the TMS 700 of FIG. 7 includes the same elements as the TMS 600 of FIG. 6. However, the TMS 700 of FIG. 7 includes a turbomachine 702 with similar elements as the turbomachine 502, but the turbomachine 702 also includes a motor and generator unit 704 (M/G unit 704) coupled to the shaft 508. In general, the turbomachine 702 includes the M/G unit 704 to supplement the power that the turbine 504 provides to the compressor 506 and/or to draw power from the turbine 504 itself. For example, when the turbomachine 702 of is operating at a rotational speed that is below a second speed threshold (e.g., 25000 rpm, 30000 rpm, 35000 rpm), the M/G unit 704 can function as a motor to bring the compressor 506 up to operating speeds (e.g., 32000 rpm, 35000 rpm, 37000 rpm, etc.) faster than the turbine 504 (or a motor) can independently. Furthermore, since the turbine 504 provides a portion of the power used to bring the compressor 506 to the operating speeds, the M/G unit 704 can operate more efficiently, consume less electrical energy, rely on less maintenance, and can be of a lesser size or weight than, for example, a motor associated with the pump 304 of FIG. 3 and/or the first and second pumps 304a-b of FIG. 4.

The M/G unit 704 of FIG. 7 can be configured similarly to a motor (e.g., brushed direct current (DC) motor, brushless DC motor, permanent magnet motor, etc.) wherein an armature with multiple windings of an electrically conductive wire (e.g., copper wire) is affixed to the shaft 508, and a stator surrounds the armature. When an electric current is supplied to the windings in the armature of the M/G unit 704, magnetic fields are generated, and permanent magnets in the stator apply a magnetic force on the windings, which rotates the shaft. Alternating electrical currents are supplied to each of the windings in the armature to cause the shaft 508 to continually rotate. Furthermore, the speed of the current alternation and the amount of voltage associated with the electrical currents can influence the amount of torque the shaft 508 generates. Additionally, when electrical current is not supplied to the M/G unit 704, and an external mechanical power (e.g., from the turbine 504) causes the armature to rotate within the stator, electrical currents are generated in the windings. In other words, based on Faraday's law of induction, the M/G unit 704 can convert electrical power into mechanical power and can also convert mechanical power into electrical power.

The control system 522 can cause a power source, such as a battery or a generator (e.g., gas turbine engine 100) on the aircraft 10, to supply electrical power to the M/G unit 704 when the turbomachine 702 operates at a rotational speed that does not satisfy (e.g., is below) the second speed threshold. More specifically, when the compressor 506 does not convert a sufficient amount of mechanical power into kinetic energy of the heat exchange fluid, the rotational speed is said to not satisfy the second speed threshold, and the control system 522 causes the power source to supply electrical power to the M/G unit 704. Alternatively, when the turbomachine 702 operates at rotational speeds that satisfy (e.g., match or exceed) the second speed threshold, the control system 522 causes the power source to cease transmission of electrical power to the M/G unit 704 and routes the current of electrical power from the M/G unit 704 to a power sink, such as onboard system(s) (e.g., cabin lighting, cabin air conditioning, fuel management system, etc.), electromechanical component(s) (e.g., pumps, heaters, actuators, etc.), and/or a battery. In some examples, the M/G unit 704 is electrically connected to a demultiplexer (not shown) that leads to a plurality of power sinks, and the control system 522 can cause the demultiplexer to switch between the plurality of power sinks based on a command input or written instructions and/or operations stored on storage device(s) and/or on a machine readable medium (discussed below). In such examples, the control system 522 can cause the demultiplexer to switch to a battery to store electrical power when the charge of the battery depletes to a particular level.

Figure 8:
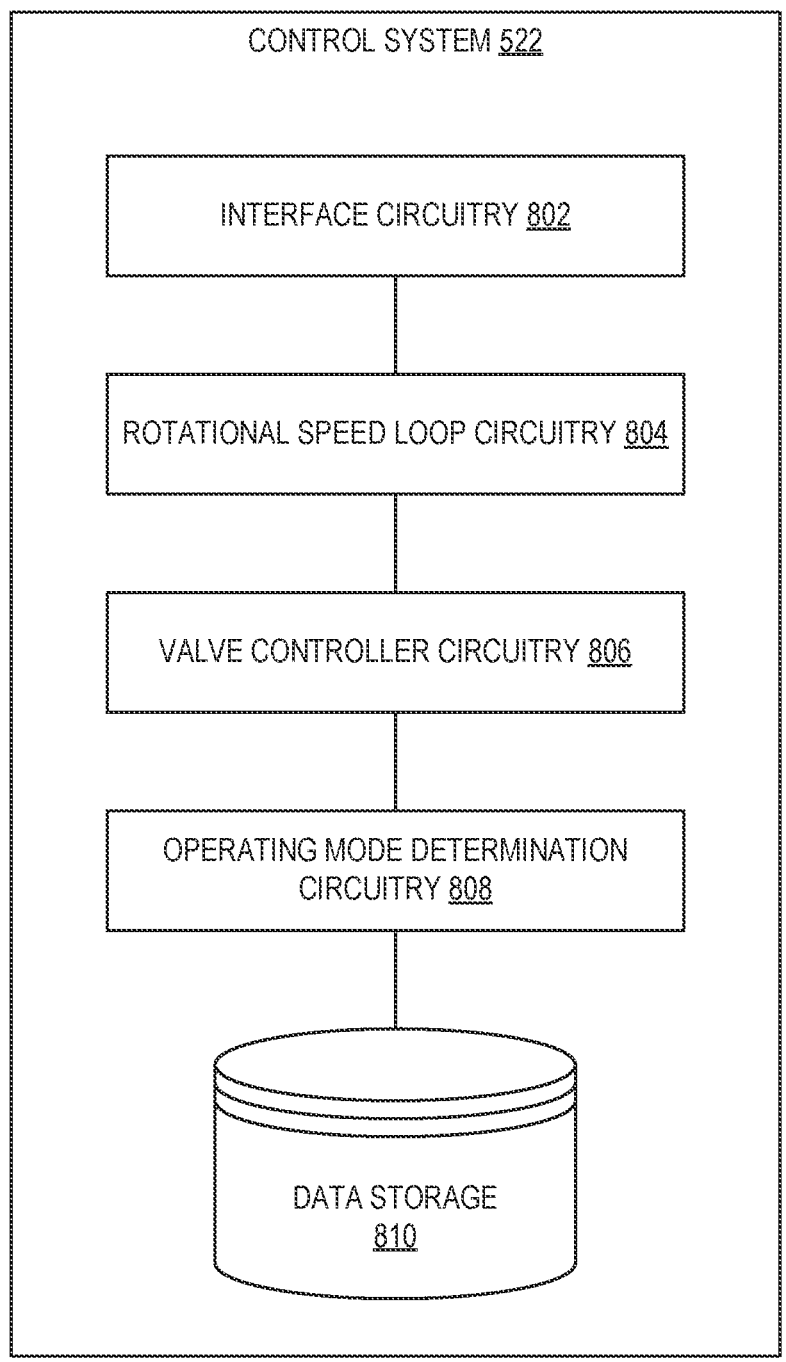
FIG. 8 is a block diagram of an example control system used in example heat driven thermal management systems of FIGS. 5-7.

Turning now to FIG. 8, a block diagram of the control system 522 to open and close (fully and/or partially) the control valve 520 based on the rotational speed of the turbomachine 502 of FIGS. 5 and 6 and/or the turbomachine 702 of FIG. 7 is provided. The control system 522 of the illustrated example of FIG. 8 includes example interface circuitry 802, example rotational speed loop circuitry 804, example valve controller circuitry 806, example operating mode determination circuitry 808, and example data storage 810. The control system 522 of FIGS. 5-8 may be instantiated (e.g., creating an instance of, bring into being for any length of time, materialize, implement, etc.) by processor circuitry such as a central processing unit executing instructions. Additionally or alternatively, the control system 522 of FIGS. 5-8 may be instantiated (e.g., creating an instance of, bring into being for any length of time, materialize, implement, etc.) by application specific integrated circuit(s) (ASIC(s)) or Field Programmable Gate Array(s) (FPGA(s)) structured to perform operations corresponding to the instructions. It should be understood that some or all of the circuitry of FIG. 8 may, thus, be instantiated at the same or different times. Some or all of the circuitry may be instantiated, for example, in one or more threads executing concurrently on hardware and/or in series on hardware. Moreover, in some examples, some or all of the circuitry of FIG. 8 may be implemented by microprocessor circuitry executing instructions to implement one or more virtual machines and/or containers.

The control system 522 includes the interface circuitry 802 to synchronize operation between input/output device(s) and circuitry (e.g., processor circuitry) of the control system 522. In some examples, the interface circuitry 802 is instantiated by processor circuitry executing interface instructions and/or configured to perform operations such as those represented by the flowchart of FIG. 9. In some examples, the aircraft 10 includes the input device(s) (e.g., switch(es), dial(s), button(s), knob(s), keyboard(s), touchpad(s), etc.) in a cockpit or another control center onboard. Using such input device(s), the operator can cause the TMS(s) 500, 600, and/or 700 to begin pumping the heat exchange fluid through the TTB(s) 302 and/or 602a. For example, when the aircraft 10 has begun or is preparing to begin operation, the pilot can provide an input to the control system indicating that the turbomachine(s) 502 and/or 702 is/are to begin pumping. In such an example, the interface circuitry 802 can generate and/or direct a signal to other circuitry of the control system 522, which can cause the control valve 520 to open.

The control system 522 includes the rotational speed loop circuitry 804 ("speed circuitry 804") to obtain data (e.g., speed measurements) from the speed sensor 524 and to determine whether the measured speed of the turbomachine(s) 502 and/or 702 (e.g., shaft 508) satisfies the first speed threshold. In some examples, the speed circuitry 804 is instantiated by processor circuitry executing rotational speed loop instructions and/or configured to perform operations such as those represented by the flowchart of FIG. 9. The speed circuitry 804 can function as a closed loop controller that obtains input feedback (e.g., rotational speed of the shaft 508) from the speed sensor 524 and sends output data (e.g., position of the control valve 520) to the valve controller circuitry 806 of the control system 522. For example, at predetermined intervals (e.g., 1 second (s), 5 s, 10 s, etc.) the speed circuitry 804 can query the speed sensor 524 to detect the current (most up to date) rotational speed of the shaft 508, the turbine 504, etc. In such an example, the speed circuitry 804 compares the rotational speed of the shaft 508 (shaft speed) to the first speed threshold to determine whether the shaft speed satisfies (e.g., matches or exceeds) the first speed threshold. When the speed circuitry 804 determines, processes, and/or verifies that the shaft speed satisfies the first speed threshold, the rotational speed loop circuitry 804 can send a signal to the valve controller circuitry 806 to close the control valve 520, which causes the flow of the heat exchange fluid in the secondary flowline 518 to cease, the shaft speed of turbine 504 to slow down, and the output pressure of the compressor 506 to reduce, thus reducing the flowrate of the heat exchange fluid in the primary flowline(s) (e.g., TTB(s) 302, 602a, and/or 602b).

The control system 522 of the example of FIG. 8 includes the valve controller circuitry 806 ("valve circuitry 806") to receive signals indicating a desired valve position from the speed circuitry 804, determine a current state of the control valve 520, and cause the position of the control valve 520 to change based on the received signals and the current state of the control valve 520. In some examples, the valve circuitry 806 is instantiated by processor circuitry executing valve controller instructions and/or configured to perform operations such as those represented by the flowchart of FIG. 9. In some examples, the speed circuitry 804 sends a signal to the valve circuitry 806 to close the control valve 520 due to excessive shaft speeds. When the valve circuitry 806 receives such a signal, the valve circuitry 806 determines whether the control valve 520 is currently set to an open or a closed state. For example, the valve circuitry 806 can query the control valve 520 to detect a position of a mechanism (e.g., plunger, ball, gate, etc.) therein. In some examples, the valve circuitry 806 detects one of an open state or a closed state when the control valve 520 is a quick opening valve or another valve of the like. In some other examples, the valve circuitry 806 detects one of an open state, a closed state, or a partially closed state when the control valve 520 is a proportional valve or another valve of the like. In such examples, the partially closed state can be represented as 20% open, 50% open, etc. Furthermore, in such examples, the valve controller circuitry 806 can be configured as a closed loop controller that receives positional feedback from the control valve 520 and continues to send output signals that cause the control valve 520 to actuate until the valve circuitry 806 determines that the control valve 520 is at the proper position based on a predetermined flowrate (e.g., reduced flowrate) in the secondary flowline 518. In general, the speed circuitry 804 determines when the shaft speed of the turbine 504 satisfies the first speed threshold, indicates to the valve circuitry 806 that the turbine 504 is rotating at excessive speeds, and the valve circuitry 806 causes the control valve 520 to close. Moreover, when the speed circuitry 804 determines that the speed of the turbomachine(s) 502 and/or 702 no longer satisfies the first speed threshold, the speed circuitry 804 sends a signal to the valve circuitry 806, which causes the control valve 520 to open again.

The control system 522 of the example of FIG. 8 includes the operating mode determination circuitry 808 ("mode circuitry 808") to determine whether the M/G unit 704 is to operate as a motor or a generator and to cause the M/G unit 704 to "change modes" accordingly. In some examples, the mode circuitry 808 is instantiated by processor circuitry executing operating mode determination instructions and/or configured to perform operations such as those represented by the flowcharts of FIGS. 9 and/or 10. Similarly to the speed circuitry 804, the mode circuitry 808 functions as a closed loop controller that continually obtains (e.g., at predetermined intervals) speed measurements from the speed sensor 524 and compares the rotational speed of the shaft 508 to the second speed threshold. When the shaft speed does not satisfy the second speed threshold, the M/G unit 704 is to operate as a motor (in a "motor mode") to supplement the mechanical power that the turbine 504 provides to the compressor 506. To cause the M/G unit 704 to operate in the motor mode, the mode circuitry 808 and/or the interface circuitry 802 can send a signal to a controller (e.g., programmable circuitry, etc.) of an electrical power source (e.g., battery, generator, etc.) to transmit electrical power to the M/G unit 704. In some examples, the mode circuitry 808 commands a controller of the M/G unit 704 to utilize electrical energy from the power source to generate electric current in the windings of the armature coupled to the shaft 508. In some other examples, the control system 522 directly controls the M/G unit 704, and the mode circuitry 808 operates the M/G unit 704 as a motor by causing electrical power to transmit to the armature of the M/G unit 704. In such examples, the mode circuitry 808 can trigger a first switch to permit electrical current to flow from the power source to the windings of the armature.

In some examples, when the M/G unit 704 operates as a motor, the mode circuitry 808 can cause the M/G unit 704 to supply a variable amount of mechanical power to the shaft 508. For example, when a first shaft speed is detected, the mode circuitry 808 can cause the M/G unit 704 to supply a first amount of mechanical power to the shaft 508. In such an example, when a second shaft speed is detected, the mode circuitry 808 can cause the M/G unit 704 to supply a second amount of mechanical power to the shaft 508. The first amount of mechanical power is greater than the second amount of mechanical power, and the first shaft speed less than the second shaft speed. Thus, as the rotational speed of the turbomachine(s) 502 and/or 702 increase(s) from startup speeds to the second speed threshold, the mode circuitry 808 can cause the M/G unit 704 to gradually reduce the amount of supplemental power provided to further conserve energy and operate the M/G unit 704 more efficiently.

When the shaft speed satisfies the second speed threshold, the M/G unit 704 is to operate as a generator (in a "generator mode") to produce electrical power induced from rotation of the shaft 508. In some examples, the second speed threshold corresponds to an operating speed that is less than the first speed threshold and that is sufficient for the compressor 506 to overcome pressure drops across the TMS(s) 500, 600, and/or 700. As such, when the turbomachine(s) 502 and/or 702 operate(s) at shaft speeds that satisfy the second speed threshold, the turbine 504 transfers an excess of mechanical power to the compressor 506. Rather than wasting the excess of mechanical power on the compressor 506, the M/G unit 704 can use the excess mechanical power to generate electrical power to be used elsewhere. The generated electrical power can be routed to a power sink, such as an onboard system (e.g., environmental control systems, flight instruments, engine instruments, etc.), a battery to store the electrical energy for later use, etc. To cause the M/G unit 704 to operate in the generator mode, the mode circuitry 808 and/or the interface circuitry 802 can send a signal to the controller of the electrical power source to cease transmission of electrical power to the M/G unit 704. In some examples, the mode circuitry 808 commands the controller of the M/G unit 704 to transmit electrical energy from the windings of the armature to the power sink. In some other examples, the control system 522 directly controls the M/G unit 704, and the mode circuitry 808 operates the M/G unit 704 as a generator by causing electrical power to transmit from the armature of the M/G unit 704. In such examples, the mode circuitry 808 can trigger a second switch to permit electrical current to flow from the windings of the armature to the power sink.

The control system 522 includes the data storage 810 to store data (e.g., speed measurements, thresholds, current operating conditions, etc.) or any information associated with the interface circuitry 802, the rotational speed loop circuitry 804, the valve controller circuitry 806, and/or the operating mode determination circuitry 808. The example data storage 810 of the illustrated example of FIG. 8 can be implemented by any memory, storage device and/or storage disc for storing data, such as flash memory, magnetic media, optical media, etc. Furthermore, the data stored in the example data storage 810 can be in any data format such as binary data, comma delimited data, tab delimited data, structured query language (SQL) structures, image data, etc.

While an example manner of implementing the control system 522 of FIGS. 5-8 is illustrated in FIG. 8, one or more of the elements, processes, and/or devices illustrated in FIG. 8 may be combined, divided, re-arranged, omitted, eliminated, and/or implemented in another way. Further, the example interface circuitry 802, the example rotational speed loop circuitry 804, the example valve controller circuitry 806, the example operating mode determination circuitry 808, and/or, more generally, the example control system 522 of FIGS. 5-8, may be implemented by hardware alone or by hardware in combination with software and/or firmware. Thus, for example, any of the example interface circuitry 802, the example rotational speed loop circuitry 804, the example valve controller circuitry 806, the example operating mode determination circuitry 808, and/or, more generally, the example control system 522, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGA(s). Further still, the example control system 522 of FIGS. 5-8 may include one or more elements, processes, and/or devices in addition to, or instead of, those illustrated in FIG. 8, and/or may include more than one of any or all of the illustrated elements, processes and devices.

Figure 9:
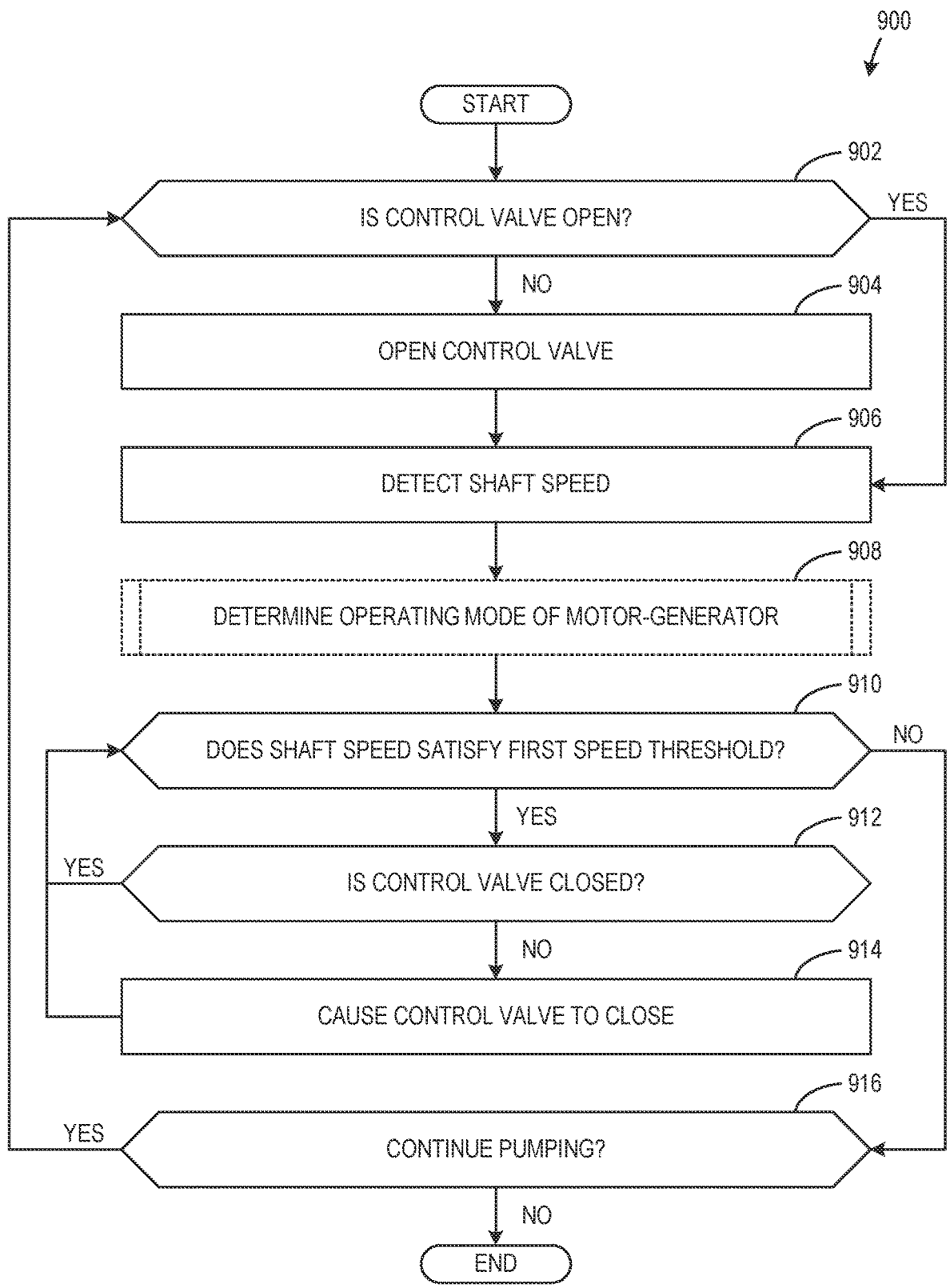
FIG. 9 is a flowchart representative of example machine readable instructions and/or example operations that may be executed by example processor circuitry to implement the example control system of FIG. 8.
Figure 10:
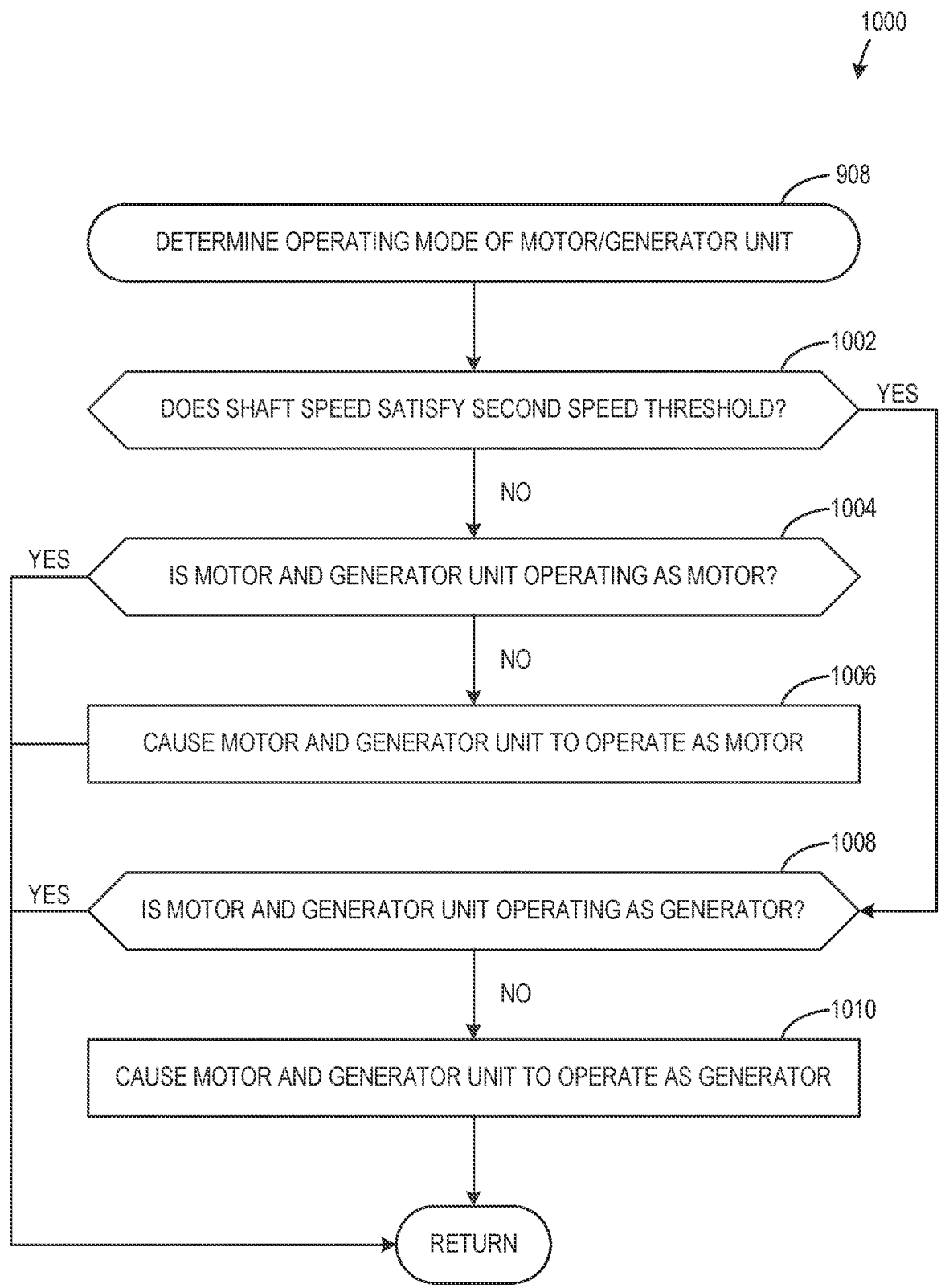
FIG. 10 is a flowchart representative of example machine readable instructions and/or example operations that may be executed by example processor circuitry to implement the example control system of FIG. 8.

Flowcharts representative of example machine readable instructions, which may be executed to configure processor circuitry to implement the control system 522 of FIGS. 5-8, are shown in FIGS. 9 and 10. The machine readable instructions may be one or more executable programs or portion(s) of an executable program for execution by processor circuitry, such as processor circuitry 1112 shown in an example processor platform 1100 discussed below in connection with FIG. 11. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 9 and 10, many other methods of implementing the example control system 522 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIGS. 9 and 10 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

FIG. 9 is a flowchart representative of example machine readable instructions and/or example operations 900 that may be executed and/or instantiated by processor circuitry to adjust a mechanical power output of the turbine 504 based on the shaft speed of the turbomachine(s) 502 and/or 702. The machine readable instructions and/or the operations 900 of FIG. 9 begin at block 902, at which the control system 522 determines whether the control valve 520 is open. For example, the valve controller circuitry 806 ("valve circuitry 806") can query the control valve 520 on a position of mechanism(s) therein to determine whether the control valve 520 is in an open or a closed state. When the valve circuitry 806 determines that the control valve 520 is open, the example operations 900 proceed to block 906. When the valve circuitry 806 determines that the control valve 520 is closed, the example operations 900 proceed to block 904.

At block 904, the control system 522 opens the control valve 520. For example, the valve circuitry 806 can send an electrical command signal to the control valve 520 to cause the mechanism(s) therein to actuate and open the control valve 520. As mentioned previously, in some examples, the control valve 520 can be variably opened based on a desired output flowrate.

At block 906, the control system 522 detects the shaft speed of the turbomachine(s) 502 and/or 702. For example, the rotational speed loop circuitry 804 ("speed circuitry 804") queries the speed sensor 524 for the current and/or most recent shaft speed measurement. As mentioned previously, the shaft speed measurement corresponds to the rotational speed and/or the angular velocity of the turbomachine(s) 502 and/or 702, and more specifically, the turbine 504, the compressor 506, and the shaft 508.

At block 908, the control system 522 determines an operating mode of the M/G unit 704. For example, the operating mode determination circuitry 808 ("mode circuitry 808") can cause the M/G unit 704 to operate as a motor or as a generator based on the measured shaft speed. Further details of the operations of block 908 are described below with connection to FIG. 10.

At block 910, the control system 522 determines whether the shaft speed satisfies the first speed threshold. For example, the speed circuitry 804 compares the shaft speed to the first speed threshold to determine whether the shaft speed is greater than, less than, or equal to the first speed threshold. When the speed circuitry 804 determines that the shaft speed does not satisfy (e.g., is less than) the first speed threshold, the operations 900 proceed to block 916. When the speed circuitry 804 determines that the shaft speed satisfies (e.g., is greater than or equal to) the first speed threshold, the operations 900 proceed to block 912.

At block 912, the control system 522 determines whether the control valve 520 is closed. For example, the valve circuitry 806 queries the control valve 520 regarding a position of the mechanism(s) therein to determine whether the control valve 520 is in an open or a closed state. When the valve circuitry 806 determines that the control valve 520 is closed, the example operations 900 return to block 910. When the valve circuitry 806 determines that the control valve 520 is open, the example operations 900 proceed to block 914.

At block 914, the control system 522 closes the control valve 520. For example, the valve circuitry 806 can send an electrical command signal to the control valve 520 to cause the mechanism(s) therein to actuate and close the control valve 520. As mentioned previously, in some examples, the control valve 520 can be variably closed based on a desired output flowrate.

At block 916, the control system 522 determines whether the TMS(s) 500, 600, and/or 700 is/are to continue pumping the heat exchange fluid (e.g., sCO2, liquid helium, helium-xenon, etc.) through the TTB(s) 302, 602a, 602b, and/or 602c. For example, the interface circuitry 802 can detect whether an input signal was received via the input device(s) mentioned previously. The input signal is a command from an operator indicating that the turbomachine(s) 502 and/or 702 is/are to cease the pressurization of the heat exchange fluid. When the interface circuitry 802 determines that the TMS(s) 500, 600, and/or 700 is/are to continue pumping, the operations 900 return to block 902. When the interface circuitry 802 determines that the TMS(s) 500, 600, and/or 700 is/are not to continue pumping, the operations 900 end and the valve circuitry 806 can cause the control valve 520 to close.

FIG. 10 is a flowchart representative of example machine readable instructions and/or example operations 1000 that may be executed and/or instantiated by processor circuitry to cause the M/G unit 704 to determine an operating mode (e.g., a motor mode or a generator mode) based on the shaft speed of the turbomachine(s) 502 and/or 702 (e.g., block 908 of the example of FIG. 9). The machine readable instructions and/or the operations 1000 of FIG. 10 begin at block 1002, at which the control system 522 determines whether the shaft speed satisfies the second speed threshold. For example, the mode circuitry 808 compares the shaft speed to the second speed threshold to determine whether the shaft speed is greater than, less than, or equal to the second speed threshold. When the mode circuitry 808 determines that the shaft speed does not satisfy (e.g., is less than) the second speed threshold, the operations 1000 proceed to block 1004. When the mode circuitry 808 determines that the shaft speed satisfies (e.g., is greater than or equal to) the second speed threshold, the operations 1000 proceed to block 1008.

At block 1004, the control system 522 determines whether the M/G unit 704 is operating as a motor. For example, the mode circuitry 808 determines whether electrical power is being supplied to armature windings of the M/G unit 704 from a power source. In some examples, one or more sensors is/are coupled to circuitry connection(s) between the M/G unit 704 and the power source. In such examples, the mode circuitry 808 queries the sensor(s) to detect whether electrical current is flowing to the M/G unit 704. Additionally or alternatively, the M/G unit 704 can include a first circuit switch to regulate flow of electrical current incoming to the M/G unit 704 and a second circuit switch to regulate flow of electrical current outgoing from the M/G unit 704. Thus, in some examples, the mode circuitry 808 determines whether the first circuit switch is active based on a query to the M/G unit 704.

At block 1006, the control system 522 causes the M/G unit 704 to operate as a motor. For example, the mode circuitry 808 can cause the power source to transmit electrical power to the M/G unit 704. Additionally or alternatively, the mode circuitry 808 can activate the first circuit switch, allow electrical current to flow to the armature windings of the M/G unit 704, and deactivate the second circuit switch if already activated.

At block 1008, the control system 522 determines whether the M/G unit 704 is operating as a generator. For example, the mode circuitry 808 determines whether electrical power is being supplied to a power sink from the armature windings of the M/G unit 704. In some examples, the mode circuitry 808 queries the sensor(s) to detect whether electrical current is flowing to the power sink. Additionally or alternatively, the mode circuitry 808 can determine whether the second circuit switch is activated based on a query to the M/G unit 704.

At block 1010, the control system 522 causes the M/G unit 704 to operate as a generator. For example, the mode circuitry 808 can cause the M/G unit 704 to transmit electrical power to the power sink. Additionally or alternatively, the mode circuitry 808 can activate the second circuit switch, allow electrical current to flow from the armature windings of the M/G unit 704, and deactivate the first circuit switch if already activated. Following completion of one or more of the blocks 1002-1010, the example operations 1000 return to block 910 of FIG. 9.

Figure 11:
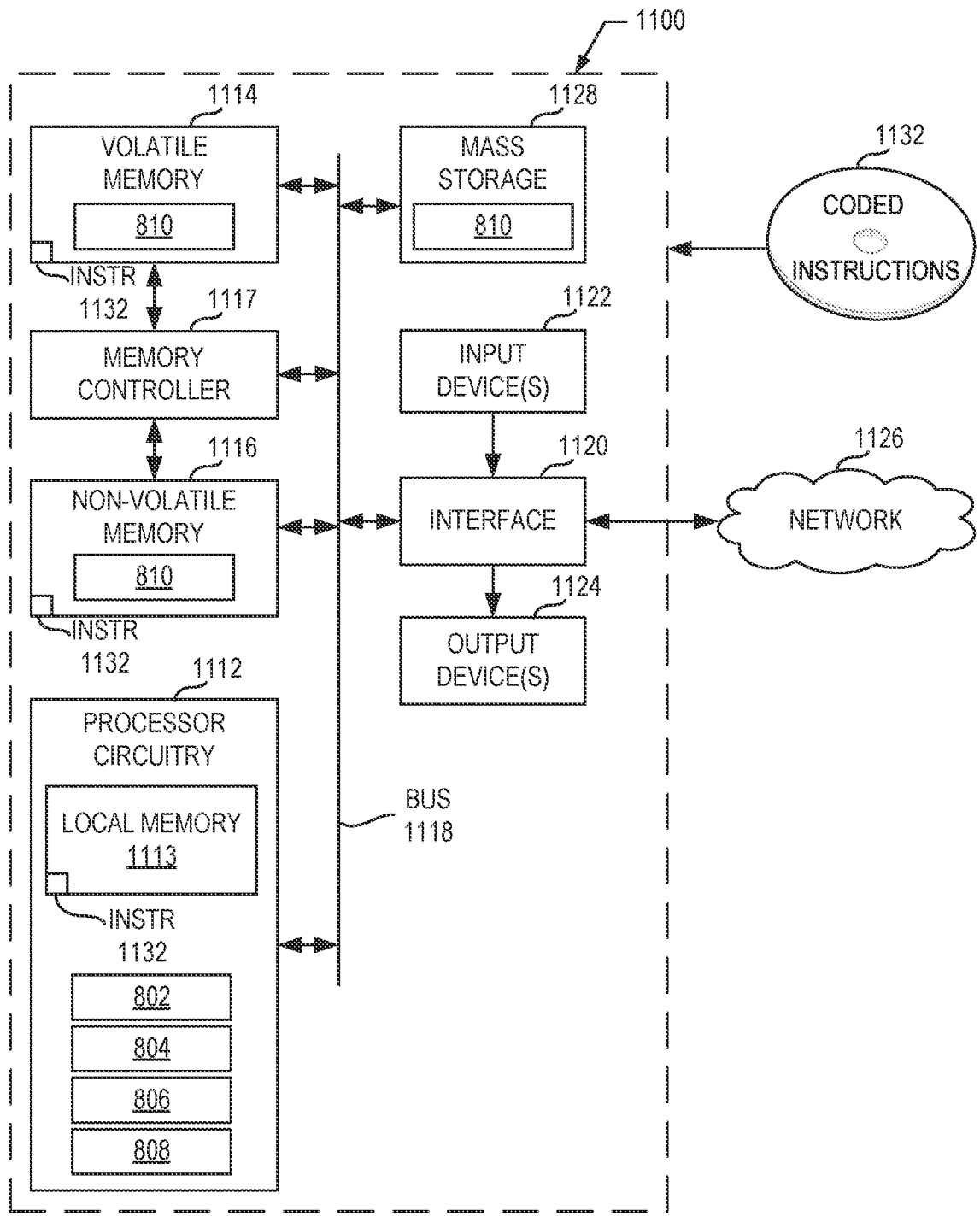
FIG. 11 is a block diagram of an example processing platform including processor circuitry structured to execute the example machine readable instructions and/or the example operations of FIGS. 9-10 to implement the example control system of FIG. 8.

FIG. 11 is a block diagram of an example processor platform 1100 structured to execute and/or instantiate the machine readable instructions and/or the operations of FIGS. 9 and 10 to implement the control system 522 of FIGS. 5-8. The processor platform 1100 can be, for example, a personal computer, a workstation, a self-learning machine (e.g., a neural network), a mobile device (e.g., a cell phone, a smart phone, a tablet such as an iPad™), a headset (e.g., an augmented reality (AR) headset, a virtual reality (VR) headset, etc.) or other wearable device, a full authority digital engine (or electronics) control (FADEC), an avionics system, or another type of computing device.

The processor platform 1100 of the illustrated example includes processor circuitry 1112. The processor circuitry 1112 of the illustrated example is hardware. For example, the processor circuitry 1112 can be implemented by one or more integrated circuits, logic circuits, FPGAs, microprocessors, CPUs, GPUs, DSPs, and/or microcontrollers from any desired family or manufacturer. The processor circuitry 1112 may be implemented by one or more semiconductor based (e.g., silicon based) devices. In this example, the processor circuitry 1112 implements the example interface circuitry 802, the example rotational speed loop circuitry 804, the example valve controller circuitry 806, the example operating mode determination circuitry 808, and/or, more generally, the example control system 522.

The processor circuitry 1112 of the illustrated example includes a local memory 1113 (e.g., a cache, registers, etc.). The processor circuitry 1112 of the illustrated example is in communication with a main memory including a volatile memory 1114 and a non-volatile memory 1116 by a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1116 may be implemented by flash memory and/or any other desired type of memory device. Access to the main memory 1114, 1116 of the illustrated example is controlled by a memory controller 1117.

The processor platform 1100 of the illustrated example also includes interface circuitry 1120. The interface circuitry 1120 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1122 are connected to the interface circuitry 1120. The input device(s) 1122 permit(s) a user to enter data and/or commands into the processor circuitry 1112. The input device(s) 1122 can be implemented by, for example, a keyboard, a button, a mouse, a touchscreen, a track-pad, a trackball, an isopoint device, and/or a control panel.

One or more output devices 1124 are also connected to the interface circuitry 1120 of the illustrated example. The output device(s) 1124 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a control panel, and/or speaker. The interface circuitry 1120 of the illustrated example, thus, typically includes a graphics driver card, a graphics driver chip, and/or graphics processor circuitry such as a GPU.

The interface circuitry 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1126. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1100 of the illustrated example also includes one or more mass storage devices 1128 to store software and/or data. Examples of such mass storage devices 1128 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 1132, which may be implemented by the machine readable instructions of FIGS. 9 and 10, may be stored in the mass storage device 1128, in the volatile memory 1114, in the non-volatile memory 1116, and/or on a removable non-transitory computer readable storage medium such as a CD or DVD.

Example heat driven thermal management systems (TMSs) are disclosed herein that include a turbomachine to power the flow of a heat exchange fluid (e.g., sCO2, liquid helium, helium-xenon, etc.) through a thermal transport bus. The turbomachine of example heat driven TMSs disclosed herein replaces a motor of a pump/compressor to reduce the weight and size of the TMS. For example, the mass and volume of the turbomachine is less than the combined mass and volume of a pump/motor housing, the cooling system(s) of the motor, the control system(s) of the motor, etc. In other words, example systems disclosed herein are assembled and/or packaged into smaller spaces by removing components and/or systems associated with electric sCO2 pumps.

Example heat driven TMSs disclosed herein utilize the turbomachine to operate more efficiently and eliminate electrical losses associated with motor driven pumps. Furthermore, since the turbomachine is a thrust balanced system, the turbomachine experiences fewer mechanical losses (e.g., vibration, friction, etc.) than the motorized pump. Turbomachines of example heat driven TMSs disclosed herein are also less complex than motorized pumps. For example, pumps designed to pressurize sCO2 in the TTB can be costly to design, manufacture, and maintain, especially when the pumps include supplementary systems (e.g., self-lubricating systems, dynamic axial loading systems, dynamic radial bearing systems, etc.) to optimize pump performance.

Example heat driven TMSs disclosed can include a motor and generator unit (M/G) coupled to a shaft between a turbine and a compressor of the turbomachine. The M/G can be of a smaller size than a typical sCO2 pump motor to maintain the reduced weight and size of the example heat driven TMSs. The M/G can operate as a motor to supplement the mechanical power the turbine transfers to the compressor or as a generator to draw electrical power from the turbine. Thus, example heat driven TMSs disclosed herein can use the M/G with the turbomachine to operate more efficiently than fully motorized and/or fully heat driven TMSs. Furthermore, example heat driven TMSs that include the M/G can power other onboard systems in addition to powering the flow of the heat exchange fluid.

Example methods, apparatus, systems, and articles of manufacture to power thermal management systems with heat of a working fluid therein are disclosed herein. Further examples and combinations thereof include the following:

Example 1 includes a thermal management system comprising a thermal transport bus loop fluidly coupled to at least one heat source exchanger and at least one heat sink exchanger, a turbomachine including a turbine and a compressor, the turbine and the compressor rotatably interlocked via a shaft, the compressor coupled to the thermal transport bus loop, the compressor to pressurize a heat exchange fluid in the thermal transport bus loop, the turbine including an inlet and an outlet, the inlet connected to a first point of the thermal transport bus loop via a first flowline, the outlet connected to a second point of the thermal transport bus loop via a second flowline, and a control valve coupled to the first flowline, the control valve to adjust a mass flowrate of the heat exchange fluid in the first flowline based on a speed of the shaft.

Example 2 includes the thermal management system of any preceding clause, wherein the at least one heat source exchanger includes a first heat source exchanger and a second heat source exchanger, and the at least one heat sink exchanger includes a first heat sink exchanger and a second heat sink exchanger, the first heat source exchanger positioned downstream of the compressor, the second heat source exchanger positioned downstream of the first heat source exchanger, the first heat sink exchanger positioned downstream of the second heat source exchanger, the second heat sink exchanger positioned downstream of the first heat sink exchanger.

Example 3 includes the thermal management system of any preceding clause, wherein the first point is positioned downstream of the second heat source exchanger and upstream of the first heat sink exchanger.

Example 4 includes the thermal management system of any preceding clause, wherein the second point is positioned downstream of the second heat sink exchanger and upstream of the compressor.

Example 5 includes the thermal management system of any preceding clause, wherein the first flowline includes a check valve upstream of the control valve and downstream of the first point.

Example 6 includes the thermal management system of any preceding clause, wherein the heat exchange fluid is supercritical carbon dioxide.

Example 7 includes the thermal management system of any preceding clause, wherein the turbine and the compressor are mounted on the shaft.

Example 8 includes the thermal management system of any preceding clause, wherein the turbine is an axial turbine, and the compressor is an axial compressor.

Example 9 includes the thermal management system of any preceding clause, wherein the shaft extends from a distal end of the turbine to a distal end of the compressor.

Example 10 includes the thermal management system of any preceding clause, wherein the turbine is a centrifugal turbine, and the compressor is a centrifugal compressor.

Example 11 includes the thermal management system of any preceding clause, further including a control system and a speed sensor, the speed sensor coupled to the turbomachine, the control system is to detect the speed of the shaft, determine whether the speed of the shaft satisfies a threshold, cause the control valve to increase an output flowrate when the speed of the shaft does not satisfy the threshold, and cause the control valve to decrease the output flowrate when the speed of the shaft satisfies the threshold.

Example 12 includes the thermal management system of any preceding clause, wherein the control system is to cause the control valve to fully open when the speed of the shaft does not satisfy the threshold, and cause the control valve to fully close when the speed of the shaft satisfies the threshold.

Example 13 includes the thermal management system of any preceding clause, wherein the speed sensor is a tachometer.

Example 14 includes the thermal management system of any preceding clause, wherein the thermal transport bus loop is a first thermal transport bus loop, the thermal management system further includes a second thermal transport bus loop, and the first and second thermal transport bus loops are configured to operate in parallel.

Example 15 includes the thermal management system of any preceding clause, wherein the turbomachine is a first turbomachine coupled to the first thermal transport bus loop, the thermal management system further includes a second turbomachine coupled to the second thermal transport bus loop.

Example 16 includes the thermal management system of any preceding clause, wherein the control valve is a pneumatic valve hydraulically actuated based on pressure of the heat exchange fluid in the thermal transport bus loop.

Example 17 includes a heat driven advanced Brayton cycle apparatus comprising a thermal transport bus to transmit a working fluid within the heat driven advanced Brayton cycle apparatus, a turbomachine including a turbine and a compressor mounted on a shaft, an inlet of the turbine fluidly coupled to the thermal transport bus via a flowline, the turbine to convert thermal energy of a portion of the working fluid to mechanical power, the shaft to transfer the mechanical power to the compressor, the compressor to convert the mechanical power into kinetic energy of the working fluid, and a control system to detect a speed of the shaft via a speed sensor, the speed sensor coupled to the turbomachine, determine whether the speed of the shaft satisfies a threshold, cause a control valve to reduce a mass flowrate in the flowline when the speed of the shaft satisfies the threshold, and cause the control valve to increase the mass flowrate in the flowline when the speed of the shaft does not satisfy the threshold.

Example 18 includes the heat driven advanced Brayton cycle apparatus of any preceding clause, wherein the thermal transport bus includes a heat source exchanger and a heat sink exchanger, the flowline coupled to the thermal transport bus at a point, the point positioned downstream of the heat source exchanger and upstream of the heat sink exchanger.

Example 19 includes the heat driven advanced Brayton cycle apparatus of any preceding clause, wherein the flowline is a first flowline, and the point is a first point, further including a second flowline fluidly coupled to an outlet of the turbine and a second point of the thermal transport bus, the second point positioned just upstream of the compressor.

Example 20 includes the heat driven advanced Brayton cycle apparatus of any preceding clause, wherein the control system is to cause the control valve to fully close when the speed of the shaft satisfies the threshold, and cause the control valve to fully open when the speed of the shaft does not satisfy the threshold.

Example 21 includes the heat driven advanced Brayton cycle apparatus of any preceding clause, further including a motor and generator unit coupled to the shaft.

Example 22 includes the heat driven advanced Brayton cycle apparatus of any preceding clause, wherein the threshold is a first threshold, and the control system is to cause the motor and generator unit to operate in a motor mode when the speed of the shaft does not satisfy a second threshold, and cause the motor and generator unit to operate in a generator mode when the speed of the shaft satisfies the second threshold.

Example 23 includes the heat driven advanced Brayton cycle apparatus of any preceding clause, wherein the control system is to cause the motor and generator unit to generate the mechanical power based on electrical power when the speed of the shaft does not satisfy the second threshold, the electrical power obtained from a power source, and cause the motor and generator unit to generate the electrical power based on the mechanical power when the speed of the shaft satisfies the second threshold, the electrical power transmitted to a power sink.

Example 24 includes the heat driven advanced Brayton cycle apparatus of any preceding clause, wherein the turbine extracts an excessive amount of power when the speed of the shaft satisfies the second threshold, the excessive amount of power to be converted to the electrical power.

Example 25 includes a method comprising detecting a shaft speed based on a measurement obtained from a speed sensor, the shaft speed corresponding to a rotational speed of a turbomachine, the turbomachine including a turbine coupled to a compressor via a shaft, the compressor integrated into a first flowline, the turbine integrated into a second flowline, determining whether the shaft speed satisfies a threshold, opening a control valve when the shaft speed does not satisfy the threshold, the control valve integrated into the second flowline, and closing the control valve when the shaft speed satisfies the threshold.

Example 26 includes the method of any preceding clause, wherein the opening of the control valve includes fully opening the control valve, and the closing of the control valve includes fully closing the control valve.

Example 27 includes the method of any preceding clause, wherein the opening of the control valve includes partially opening the control valve to a first area, and the closing of the control valve includes partially closing the control valve to a second area, the first and second areas based on a predetermined flowrate in the second flowline.

Example 28 includes the method of any preceding clause, further including determining an operating mode of a motor and generator unit coupled to the turbomachine.

Example 29 includes the method of any preceding clause, wherein the threshold is a first threshold, and the determining of the operating mode includes determining whether the shaft speed satisfies a second threshold, causing the motor and generator unit to operate as a motor when the shaft speed does not satisfy the second threshold, and causing the motor and generator unit to operate as a generator when the shaft speed satisfies the second threshold.

Example 30 includes a thermal management system comprising a thermal transport bus to transmit a working fluid between at least one heat source exchanger and at least one heat sink exchanger, the thermal transport bus including a flowline branching from the thermal transport bus at a first point, the flowline reconnecting to the thermal transport bus at a second point, a turbomachine including a turbine coupled to a compressor via a shaft, the turbine fluidly coupled to the flowline, the turbine to convert thermal energy of the working fluid to mechanical energy of the shaft, the compressor fluidly coupled to the thermal transport bus, the compressor to convert the mechanical energy of the shaft to kinetic energy of the working fluid, the turbomachine including a motor and generator unit mounted on the shaft, and a control system configured to detect a speed of the shaft via a speed sensor, determine whether the speed of the shaft satisfies a threshold, operate the motor and generator unit as a motor when the speed of the shaft does not satisfy the threshold, and operate the motor and generator unit as a generator when the speed of the shaft satisfies the threshold.

Example 31 includes the thermal management system of any preceding clause, wherein the at least one heat source exchanger includes a first heat source exchanger and a second heat source exchanger, and the at least one heat sink exchanger includes a first heat sink exchanger and a second heat sink exchanger, the first heat source exchanger positioned downstream of the compressor, the second heat source exchanger positioned downstream of the first heat source exchanger, the first heat sink exchanger positioned downstream of the second heat source exchanger, the second heat sink exchanger positioned downstream of the first heat sink exchanger.

Example 32 includes the thermal management system of any preceding clause, wherein the first point is positioned downstream of the second heat source exchanger and upstream of the first heat sink exchanger.

Example 33 includes the thermal management system of any preceding clause, wherein the second point is positioned downstream of the second heat sink exchanger and upstream of the compressor.

Example 34 includes the thermal management system of any preceding clause, wherein the flowline includes a check valve downstream of the first point.

Example 35 includes the thermal management system of any preceding clause, wherein the working fluid is supercritical carbon dioxide.

Example 36 includes the thermal management system of any preceding clause, wherein the turbine and the compressor are mounted on the shaft.

Example 37 includes the thermal management system of any preceding clause, wherein the turbine is an axial turbine, and the compressor is an axial compressor.

Example 38 includes the thermal management system of any preceding clause, wherein the shaft extends from a distal end of the turbine to a distal end of the compressor.

Example 39 includes the thermal management system of any preceding clause, wherein the turbine is a centrifugal turbine, and the compressor is a centrifugal compressor.

Example 40 includes the thermal management system of any preceding clause, wherein the threshold is a first threshold, further including a control valve coupled to the flowline and positioned upstream of the turbine, the control system to detect the speed of the shaft, determine whether the speed of the shaft satisfies a second threshold, open the control valve when the speed of the shaft does not satisfy the second threshold, and close the control valve when the speed of the shaft satisfies the second threshold.

Example 41 includes the thermal management system of any preceding clause, wherein the control valve is a pneumatic valve, the control valve hydraulically actuated based on pressure of the working fluid in the thermal transport bus.

Example 42 includes the thermal management system of any preceding clause, wherein the speed sensor is a tachometer.

Example 43 includes the thermal management system of any preceding clause, wherein the thermal transport bus is a first thermal transport bus, further including a second thermal transport bus, the first and second thermal transport buses configured to operate in parallel.

Example 44 includes the thermal management system of any preceding clause, wherein the turbomachine is a first turbomachine coupled to the first thermal transport bus, further including a second turbomachine coupled to the second thermal transport bus.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A thermal management system comprising:
a thermal transport bus loop fluidly coupled to at least one heat source exchanger and at least one heat sink exchanger;
a turbomachine including a turbine and a compressor, the turbine and the compressor rotatably interlocked via a shaft, the compressor coupled to the thermal transport bus loop, the compressor including a compressor inlet, the compressor to pressurize a heat exchange fluid in the thermal transport bus loop, the turbine including a turbine inlet and a turbine outlet, the turbine inlet connected to a first point of the thermal transport bus loop via a first flowline, the turbine outlet connected to a second point of the thermal transport bus loop via a second flowline, the second point disposed downstream of the heat sink exchanger and immediately upstream of the compressor inlet;
a check valve coupled to the first flowline, the check valve preventing a backflow of the heat exchange fluid from the turbine inlet to the first point; and
a control valve coupled to the first flowline, the control valve to adjust a mass flowrate of the heat exchange fluid in the first flowline based on a speed of the shaft.

2. The thermal management system of claim 1, wherein the at least one heat source exchanger includes a first heat source exchanger and a second heat source exchanger, and the at least one heat sink exchanger includes a first heat sink exchanger and a second heat sink exchanger, the first heat source exchanger positioned downstream of the compressor, the second heat source exchanger positioned downstream of the first heat source exchanger, the first heat sink exchanger positioned downstream of the second heat source exchanger, the second heat sink exchanger positioned downstream of the first heat sink exchanger.

3. The thermal management system of claim 2, wherein the first point is positioned downstream of the second heat source exchanger and upstream of the first heat sink exchanger.

4. The thermal management system of claim 1, further including a control system and a speed sensor, the speed sensor coupled to the turbomachine, the control system is configured to:
detect the speed of the shaft;
determine whether the speed of the shaft satisfies a threshold;
cause the control valve to increase an output flowrate when the speed of the shaft does not satisfy the threshold; and
cause the control valve to decrease the output flowrate when the speed of the shaft satisfies the threshold.

5. The thermal management system of claim 4, wherein the control system is configured to:
cause the control valve to fully open when the speed of the shaft does not satisfy the threshold; and
cause the control valve to fully close when the speed of the shaft satisfies the threshold.

6. The thermal management system of claim 1, wherein:
the thermal transport bus loop is a first thermal transport bus loop,
the thermal management system further includes a second thermal transport bus loop, and
the first and second thermal transport bus loops are configured to operate in parallel.

7. The thermal management system of claim 6, wherein:
the turbomachine is a first turbomachine coupled to the first thermal transport bus loop,
the thermal management system further includes a second turbomachine coupled to the second thermal transport bus loop.

8. A heat driven advanced Brayton cycle apparatus comprising: a thermal transport bus to transmit a working fluid within the heat driven advanced Brayton cycle apparatus; a turbomachine including a turbine and a compressor mounted on a shaft, the compressor including a compressor inlet, the turbine including a turbine inlet and a turbine outlet, the turbine inlet fluidly coupled to the thermal transport bus via a first flowline, the turbine to convert thermal energy of a portion of the working fluid to mechanical power, the shaft to transfer the mechanical power to the compressor, the compressor to convert the mechanical power into kinetic energy of the working fluid the turbine outlet connected to a point of the thermal transport bus via a second flowline, the point disposed downstream of a heat sink exchanger of the thermal transport bus and immediately upstream of the compressor inlet; and
a check valve coupled to the first flowline, the check valve preventing backflow of the working fluid through the first flowline from the turbine inlet;
a control system configured to:
detect a speed of the shaft via a speed sensor, the speed sensor coupled to the turbomachine;
determine whether the speed of the shaft satisfies a threshold;
cause a control valve to reduce a mass flowrate in the first flowline when the speed of the shaft satisfies the threshold; and
cause the control valve to increase the mass flowrate in the first flowline when the speed of the shaft does not satisfy the threshold.

9. The heat driven advanced Brayton cycle apparatus of claim 8, wherein the point is a second point, the thermal transport bus includes a heat source exchanger, the first flowline coupled to the thermal transport bus at a first point, and the first point positioned downstream of the heat source exchanger and upstream of the heat sink exchanger.

10. The heat driven advanced Brayton cycle apparatus of claim 8, wherein the control system is configured to:
cause the control valve to fully close when the speed of the shaft satisfies the threshold; and
cause the control valve to fully open when the speed of the shaft does not satisfy the threshold.

11. The heat driven advanced Brayton cycle apparatus of claim 8, further including a motor and generator unit coupled to the shaft.

12. The heat driven advanced Brayton cycle apparatus of claim 11, wherein the threshold is a first threshold, and the control system is to:
cause the motor and generator unit to operate in a motor mode when the speed of the shaft does not satisfy a second threshold; and
cause the motor and generator unit to operate in a generator mode when the speed of the shaft satisfies the second threshold.

13. The heat driven advanced Brayton cycle apparatus of claim 12, wherein the control system is to:
cause the motor and generator unit to generate the mechanical power based on electrical power when the speed of the shaft does not satisfy the second threshold, the electrical power obtained from a power source; and
cause the motor and generator unit to generate the electrical power based on the mechanical power when the speed of the shaft satisfies the second threshold, the electrical power transmitted to a power sink.

14. A method comprising:

detecting a shaft speed based on a measurement obtained from a speed sensor, the shaft speed corresponding to a rotational speed of a turbomachine of a thermal transport bus loop, the turbomachine including a turbine coupled to a compressor via a shaft, the compressor integrated into a first flowline, the turbine integrated into a second flowline, an outlet of the turbine connected to a point of the thermal transport bus loop via the second flowline, the point disposed downstream of a heat sink exchanger of the thermal transport bus loop and immediately upstream of an inlet of the compressor, the second flowline including a check valve to prevent backflow from the turbine via the second flowline;

determining whether the shaft speed satisfies a threshold;

opening a control valve when the shaft speed does not satisfy the threshold, the control valve integrated into the second flowline; and closing the control valve when the shaft speed satisfies the threshold.

15. The method of claim 14, wherein the opening of the control valve includes fully opening the control valve, and the closing of the control valve includes fully closing the control valve.

16. The method of claim 14, wherein the opening of the control valve includes partially opening the control valve to a first area, and the closing of the control valve includes partially closing the control valve to a second area, the first and second areas based on a predetermined flowrate in the second flowline.

17. The method of claim 14, further including determining an operating mode of a motor and generator unit coupled to the turbomachine.

18. The method of claim 17, wherein the threshold is a first threshold, and the determining of the operating mode includes:

determining whether the shaft speed satisfies a second threshold;

causing the motor and generator unit to operate as a motor when the shaft speed does not satisfy the second threshold; and causing the motor and generator unit to operate as a generator when the shaft speed satisfies the second threshold.

\* \* \* \* \*